United States Patent [19]
Goldberg et al.

[11] Patent Number: 5,343,401
[45] Date of Patent: Aug. 30, 1994

[54] EMBROIDERY DESIGN SYSTEM

[75] Inventors: Brian J. Goldberg, York; Anastasios Tsonis, Waterloo, both of Canada

[73] Assignee: Pulse Microsystems Ltd., Ontario, Canada

[21] Appl. No.: 946,753

[22] Filed: Sep. 17, 1992

[51] Int. Cl.$^5$ .................. G06F 15/46; D05C 5/02
[52] U.S. Cl. .................. 364/470; 364/188; 112/266.1
[58] Field of Search .................. 364/470, 146, 188; 112/266.1; 395/155

[56] References Cited

U.S. PATENT DOCUMENTS

| | | | |
|---|---|---|---|
| 4,149,246 | 4/1979 | Goldman | 364/470 |
| 4,352,334 | 10/1982 | Childs et al. | 112/266.1 |
| 4,720,795 | 1/1988 | Kinoshita et al. | 364/470 |
| 4,821,662 | 4/1989 | Pongrass et al. | 112/266.1 |
| 5,056,444 | 10/1991 | Lowry et al. | 112/221 |

Primary Examiner—Paul Gordon
Attorney, Agent, or Firm—David M. Klein; Bryan Cave

[57] ABSTRACT

An interactive system and method for creating and modifying embroidery designs is disclosed. The system provides a user with numerous functions for interactively creating and modifying embroidery designs, and generating the necessary stitch commands for recreating the embroidery design on an embroidery stitching machine. The system is preferably operative on an IBM PC. The system is menu-based, and may be used for modifying embroidery designs in either outline-format or stitch-format. Once a design has been entered, the user may utilize predetermined functions to quickly alter a design and visualize the resulting design. The system further provides a method for modifying embroidery designs in an outline format into bridge type lettering.

9 Claims, 30 Drawing Sheets

EMBROIDERY DESIGN SYSTEM

BACKGROUND OF THE INVENTION

1 Field of the Invention

The present invention relates generally to embroidering systems, and more particularly to a system for creating and modifying embroidery designs in either outline or stitch data format.

2. Description of the Prior Art

Systems to stitch embroidered lettering on articles are commonly known. Typically, embroidered lettering is described in terms of the stitch movements needed to control a stitching machine for reproducing lettering. In traditional prior art systems, embroidery characters are stored in a stitch-by-stitch format, in which each stitch and all needle-control data which were needed to recreate the embroidery design on the embroidery machine were stored.

Embroidery machines are generally controlled by programs, with a separate program required for each embroidery design. There are very few methods available which provide the ability to modify existing embroidery design programs. Methods that are available for modifying existing embroidery design programs are extremely limited. Prior methods for editing embroidery design programs have primarily been limited to increasing or decreasing the size of a pattern, varying stitch densities, changing the orientation of a design, producing a mirror image of a design, and varying fill, running, jump and satin stitch lengths. Furthermore, since all such prior art systems operate only on low level stitch data, they require that the voluminous stitch data be loaded into memory before any manipulation of the embroidery pattern may be done, and consequently that each individual stitch point be transformed during the manipulation process. This increases the processing time and memory requirements for such prior art systems.

Examples of such prior art systems for varying the parameters associated with a stitch pattern design in order to control stitching machinery, such as an embroidery machine or a sewing machine, are disclosed in Pongrass et al., U.S. Pat. No. 4,821,662 and Kinoshita et al., U.S. Pat. No. 4,720,795. These prior art methods, however, are limited in their editing capability and, for example, provide no means for converting straight line portions of a design pattern to smoothed curves, nor do they provide a means for converting a portion or all of the stitching in a design from one type of stitching, such as satin or tatami, to a different type of stitching.

These characteristics of the prior art are overcome in our previously filed, commonly owned U.S. Pat. No. 5,270,939, issued on Dec. 14, 1993, and entitled METHOD FOR MODIFYING EMBROIDERY DESIGN PROGRAMS, the contents of which are incorporated herein by reference, in its entirety. As described therein, the low-level stitch-by--stitch numerical control codes for embroidery character representations may be converted into a condensed, high-level, data outline format ("outline format") which may be edited, modified and converted back to stitch data. The outline data files may have any convenient format. Generally, these files contain point data, which, when connected, create a frame of the embroidery character. If desired, the outline data may also contain stitch control data, such as stitch density, or pull compensation. The prior art methods currently available do not permit a user to convert an embroidery design program into such an outline format which can be easily edited and manipulated.

Childs et al, U.S. Pat. No. 4,352,334 discloses a prior art system for stitching along an arc employing the traditional storage of low-level stitch data, and requires that all. of this stitch data be loaded and retained in memory before any transposition of the stitch data to the arced orientation may occur. Furthermore, Childs does not modify the shape of the embroidery character itself, but merely the orientation of the character. These disadvantages inhibit the provision of an efficient system for manipulation of embroidery designs, such as for providing bridge lettering.

While conventional embroidery stitching systems, such as Childs et al, can place letters on straight lines, either horizontally, vertically, at an angle, or on arcs or circles, none of the prior embroidery systems can efficiently provide true bridge lettering for embroidery patterns. This is so even though bridge lettering systems are commonly known for silkscreening or in typography. For example, in silkscreening, it is necessary only to generate the exterior line segments of the lettering. These segments must include the necessary curvature of the bridge. Embroidery requires more than just the outline data to do bridge lettering. Embroidered letters are typically made from outline data which comprises both a description of the outline of the lettering, as well as stitch instructions.

Thus, it is desirable to have a system which can be used to create embroidery designs, and modify the designs in different ways in an efficient and timely manner. It is also desirable that the system may operate on outline data to obviate the need for converting large numbers of stitch point data when changing the orientation of the embroidery design as is required when low-level stitch data is employed. It is also desirable that the system should be able to generate the necessary stitch codes for driving the different types of embroidery machines to stitch the created design.

SUMMARY OF THE INVENTION

The present invention is an interactive system and method for creating and modifying embroidery designs. The system provides a user with numerous functions for creating embroidery designs, and generating the necessary stitch commands for recreating the embroidery design on an embroidery stitching machine. The system is preferably operative on an IBM PC for data processing.

The present system is menu-based, providing a series of interrelated data entry and design screens for entering and modifying embroidery representations. The present system may be used for modifying embroidery designs in either outline-format or stitch-format. New designs may be created by drawing outline points, which are entered and edited using functions and tools provided by the present system. Once a design is complete, the system generates the necessary stitch commands for recreating the design on an embroidery stitching machine.

In order to simplify editing, the system allows outline points and stitch points to be grouped and edited together.

The Main System Functions include: Punch, which allows a user to create a new design, or add to one which has already been entered; Output, which will generate stitch or outline data outputs of a design to, for example, tape, disk, or plotter; Edit permits the user to edit a design once it has been created, moving, deleting and inserting outline points, segments or stitches; and Utilities which allows the user to set a number of system parameters.

Designs are created by drawing or tracing each segment of the design into the system. Before each segment is drawn, a user preferably identifies the type of stitch to be used for that portion of the design, and provides any information required by the system in order to generate the stitches. Once the design has been entered, the system provides a variety of functions for editing and modifying the design and stitch output.

The system allows the user to perform predetermined transformations on the design, which may include text or graphics, for example, allowing the design to be made: Vertical by placing the design along a straight line drawn in any direction, with the letters always sitting vertically; Rotate, which places the letters along a straight line drawn in any direction, and rotates the letters to sit on the line; Arc, which places the letters along an arc; Circle, in which one design is placed on the top of a circle, going clockwise, and one on the bottom, going counter-clockwise; Vertical Arc: which modifies the lettering so the backs of the letters are vertical, but they are shaped to fit a specified area; Bridge, which arcs the top and/or bottom of the design.

The present system allows a user to more quickly create and modify an embroidery design than was previously possible. Once a design has been entered, the user may utilize predetermined functions to quickly alter a design and visualize the resulting design. The user may change stitch types and colors of the design points resulting in changes to hundreds of stitches. Consequently, the present system provides a novel tool for the embroidery design industry.

DESCRIPTION OF THE PREFERRED EMBODIMENT

Figure 1:
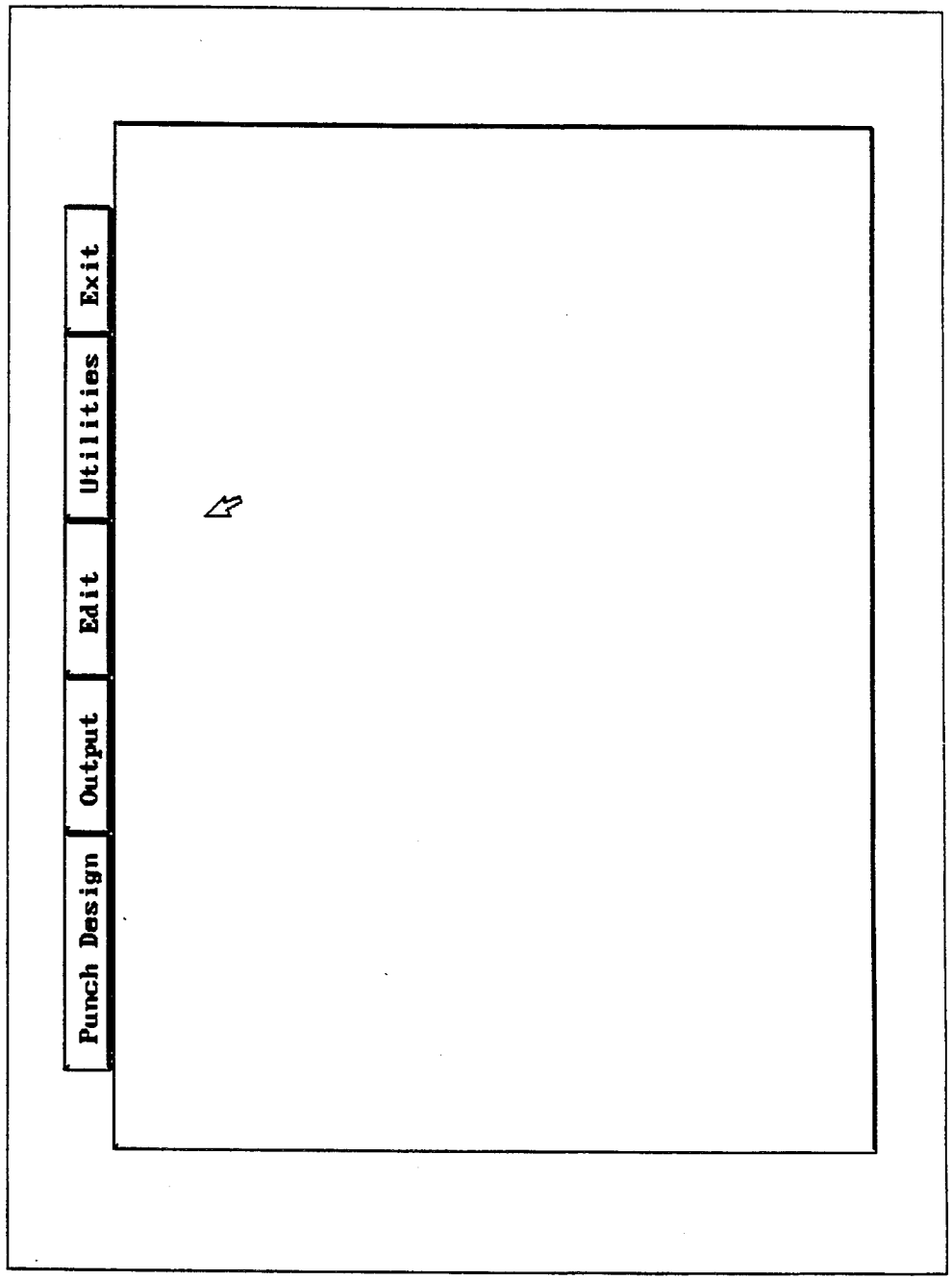
FIG. 1 shows the Main Menu of the embroidery design system of the present invention.

The present invention is a real-time interactive system for creating and modifying embroidery designs. An embroidery design is, generally, a representation of a group of embroidery letters or characters. The system provides a user with numerous features to automate a task which was previously performed manually. These functions assist the user in creating embroidery designs, and will generate the necessary stitch commands for recreating the embroidery design on an embroidery stitching machine.

The system preferably operates on an IBM PC or compatible computer platform which performs the required data processing as hereinafter described. However, it is readily foreseen that the present invention may be operable on a variety of computer systems, and be implemented in either hardware or software. While a design is being worked on, the system preferably maintains it in RAM and displays the design on a monitor, television screen or other display means. Once it is desired to store the design, a hard disk or floppy disk is preferably provided for long-term mass storage of designs, and the system software.

The present invention may include a digitizer for tracing a preexisting design into the system for manipulation. The system may also be configured with a punch unit for creating and reading paper tapes, and/or a plotter for creating color worksheets displaying a design and certain design-related information.

The present manipulation system is preferably menu-based, and includes a plurality of interrelated data entry and design screens for entering and modifying embroidery representations in either outline or stitch format. Each screen preferably includes icons, data entry boxes, or other screen displays for allowing a user to enter design information, and for the system to provide informational messages to the user. Screen displays are provided in which system functions are presented in lists, from which a user then picks the item or function that is desired to be performed from the list. Additionally, the system preferably includes "hotkey" functions which allow the user to activate often used functions with a reduced number of keystrokes. Choosing certain menu items may result in another menu being presented, for example when main menu items are chosen. It is understood that the various features and functions of the present invention may be mapped into the keyboard keys, mouse buttons or digitizer puck in a variety of combinations, as desired for the particular application. Furthermore, it is readily understood that the menu organization as herein described is but one possible organization of the many features described.

The present system may be used to modify embroidery designs in either outline-format or stitch-format. As described below, the points that are entered when drawing the design are called Outline Points. Stitches, on the other hand, are created by the system once the design has been drawn. This is the information that actually controls the embroidery machine for reproducing the desired design. Stitches are created using Outline Points.

Both of these can preferably be edited by the present invention. Because Outlines are used to create stitches, every change in Outline points will result in changes to one or possibly many thousands of stitches. On the other hand, because stitches are not used to create outlines, changes made in the stitch edit mode will not cause a change to be made to Outlines.

The system is further capable of modifying Segments. Segments are outline points that are grouped together, for example every time a stitch type is chosen. So a segment may be a group of points that together make, for example, a satin part of the design. By further grouping the outline points of a design into Segments, manipulation of the design is simplified.

The present system uses the Outline points entered when the design is drawn to create stitches. The stitches are created at a user-specified size.

The Main System Functions of the present invention are divided into categories which are preferably displayed on a main system menu, as shown in FIG. 1.

Punch: This is the function which permits the user to create a new design, or add to one which has already been entered.

Output: Once the design has been 'punched,' the user is given the option to choose the output form (i.e. tape, disk, plotter etc.) using the Output function. Most importantly, in this menu a user can preferably respecify the size and density of the drawing stitches and "re-generate" the stitches.

Edit: Using this group of functions, a user can edit a design once it has been created, moving, deleting and inserting outline points, segments or stitches.

Utilities: This menu allows a user to set a number of system parameters, tailoring the system to individual needs.

Designs are created by drawing or tracing each piece or 'segment' of the design in the Punch function of the system. Before each segment is drawn, a user preferably identifies the type of stitch to be used for that portion of the design, and provides any information required by the system in order to generate the stitches.

Once the design has been drawn, a user may 'output' it to one or more media: paper tape, diskette or a plotted worksheet using the 'Output' function. This is preferably the time that the user specifies the size, density and pull compensation to be used for the output. A user may re-output as many times as desired, at different sizes, densities and pull compensations without re-drawing the design.

Punching a design preferably consists of the following steps:
1. Entering the Design Parameters.
2. Entering Reference Points.
3. Choosing stitch types and Digitizing the design.
4. Entering the Start and Stop positions for the design, or having the system do so automatically.

Figure 2:
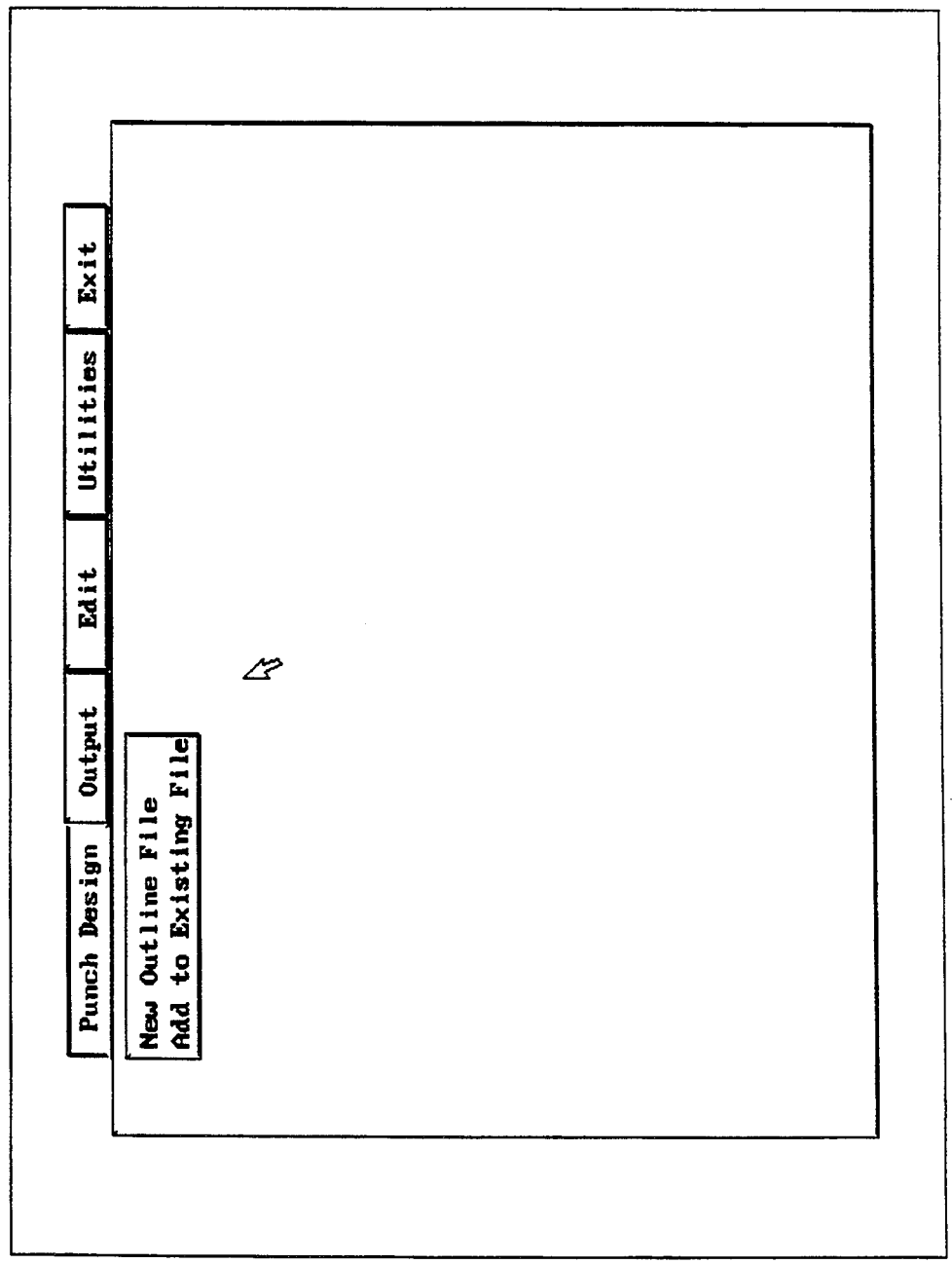
FIG. 2 shows the Punch Menu of the embroidery design system of the present invention.

The first step in the punching process is to choose Punch from the main menu as shown in FIG. 2. When a design is Punched, an Outline is being inputted into the system which will be used to create the stitches for the embroidery machine.

A menu is preferably presented having two options: Create a New Outline File; or Add to an Existing File.

Figure 3:
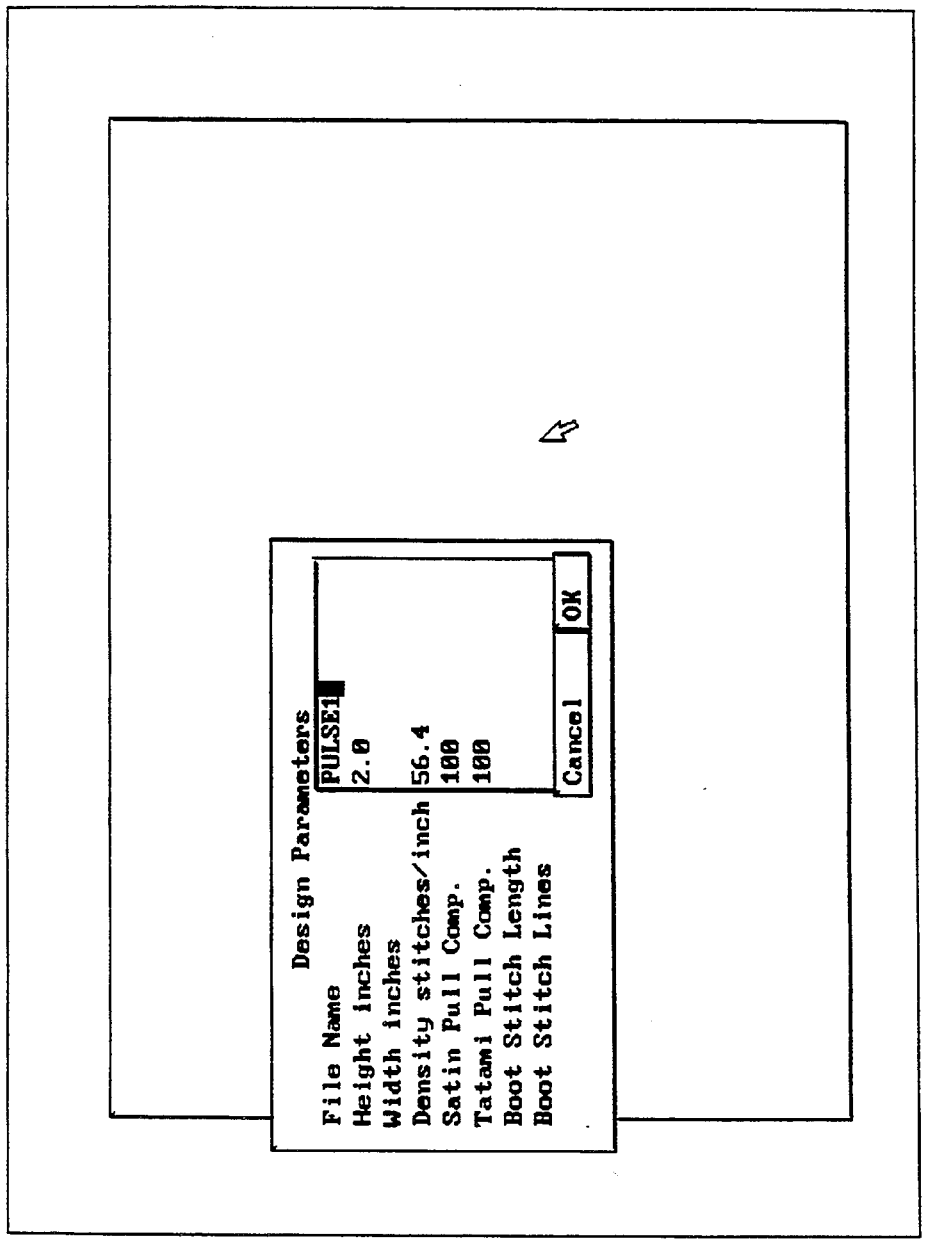
FIG. 3 shows the Design Parameters screen of the embroidery design system of the present invention.

Mew Outline File: Choosing this menu preferably give the user a screen as shown in FIG. 3, the Design Parameters screen. This screen preferably presents a data box in which to provide information about the design about to be drawn. The following items are preferably included on this screen:

The File Name is the name under which this design is stored on the hard or floppy disk.

The Height and Width define the size of the design. It is preferably not necessary to enter both of these. If only one is entered, the rest of the design is scaled proportionally. If both are entered, the system will stretch or squeeze the design in order to meet the user-defined size criteria. If no value is entered, the system preferably includes a default value.

The Density of stitches in the distance between adjacent stitches for Satins and Tatamis, preferably in millimeters. The density can preferably be changed when the stitches are re-generated. As described below, the user may adjust the density for specific parts of the design (called "segments"). The Density preferably has a default value.

Satin and Tatami Pull Compensation refer to the percentage that satins and tatamis should be "over-stitched" in order to compensate for the pull of the fabric on the embroidery machine. For example, if part of a design is a large filled-in circle, the fabric will pull together as the embroidery machine stitches, and the circle will end up looking like an oval. Pull Compensation can be performed manually by digitizing that circle wider than it actually is, or the by having the system adjust the shape of that circle to be wider. Pull compensation is preferably expressed as a percentage.

Boot Stitch Length is the default length of the run stitches in a "Boot" decorative stitch, as described below.

Boot Stitch Lines is the default number of lines in the Boot stitches.

Once the Design Parameters screen has been completed, the system will prompt the user to enter three Reference Points: the lower left point of the design, the bottom right, then the upper right. These reference points are used for aligning the artwork or characters which comprise a design, and to provide a reference for sizing the design.

Figure 4:
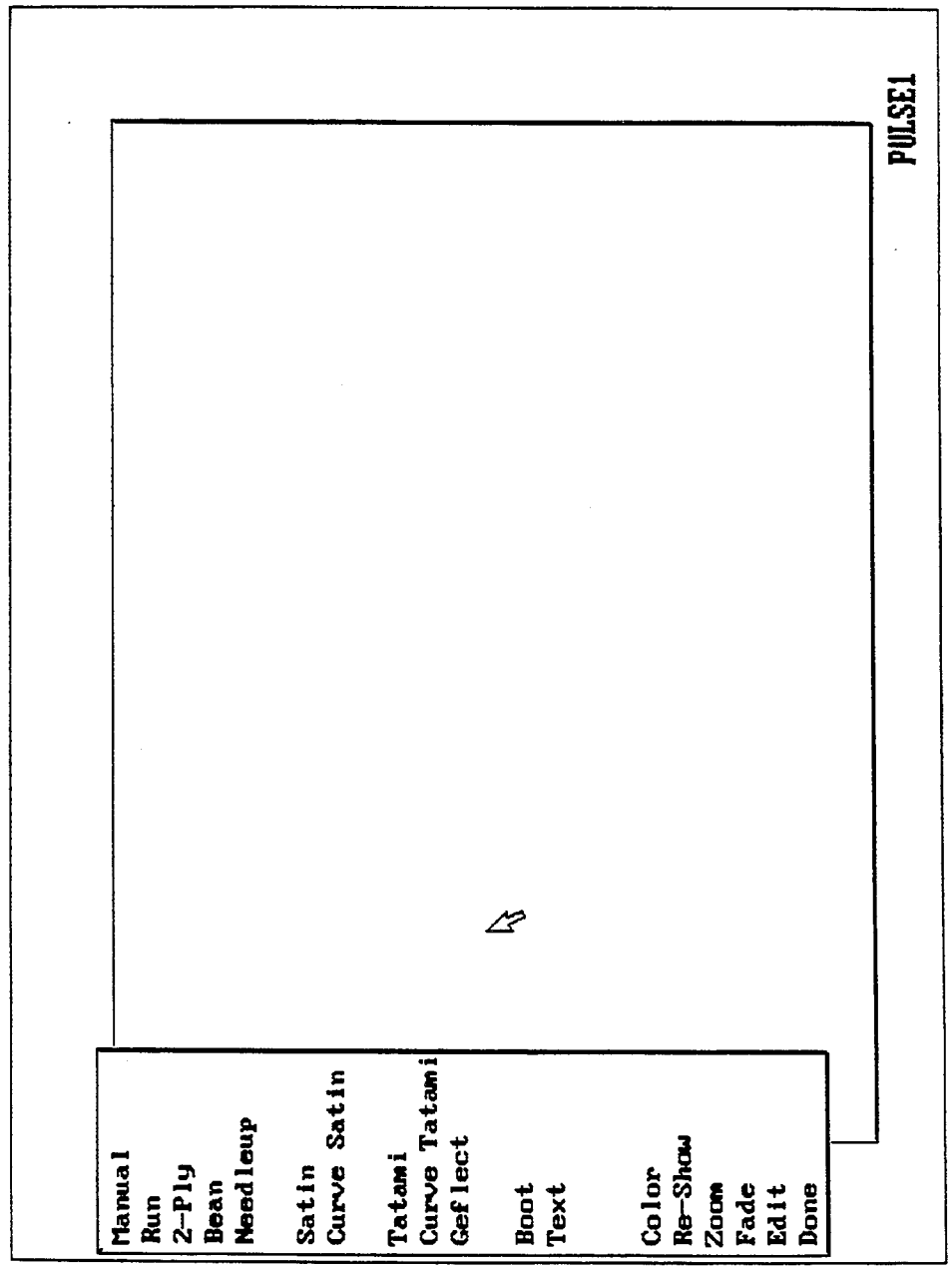
FIG. 4 shows a menu listing the stitch types that are preferably available on the embroidery design system of the present invention.

Once this information has been entered, a design may be drawn. Drawing the design preferably consists of choosing a stitch type, then drawing a segment, then choosing the next stitch type and drawing that segment, etc. FIG. 4 shows the menu that a user is preferably presented with after entering all the Design Parameters and the Reference Points. This menu lists the stitch types that are available. It also lists some special functions which a user may need to perform while punching.

All stitch types can generally be placed in one of two groups: 'line' stitches which trace a defined line (one or more times) and 'region' stitches which fill a region with or without penetration of the fabric as it is filling the region. The line stitch types preferably include: Manual, Run, 2-Ply, Bean and Needleup. The region stitch types preferably include: Satin, Curved Satin, Tatami, and Curved Tatami. The other functions are preferably Boot, Monogram, Mirror, Previous, Re-Show, Fade and Done.

In use, a user might select 'Run' to enter a run stitch. The system preferably displays a large "Crosshair" cursor. The user would move the cursor to the first point in the Run stitch segment and push a predefined button. The user then traces the Run segment, pushing the button wherever the segment turns. While drawing, the system preferably displays, for example, the current stitch type, the needle number, and the current stitch length. For every stitch exceeding the stitch length, a stitch will be inserted if the user has not already put one there. The last point digitized preferably has a little box with a cross in it to help remember where the user left off.

Figure 6:
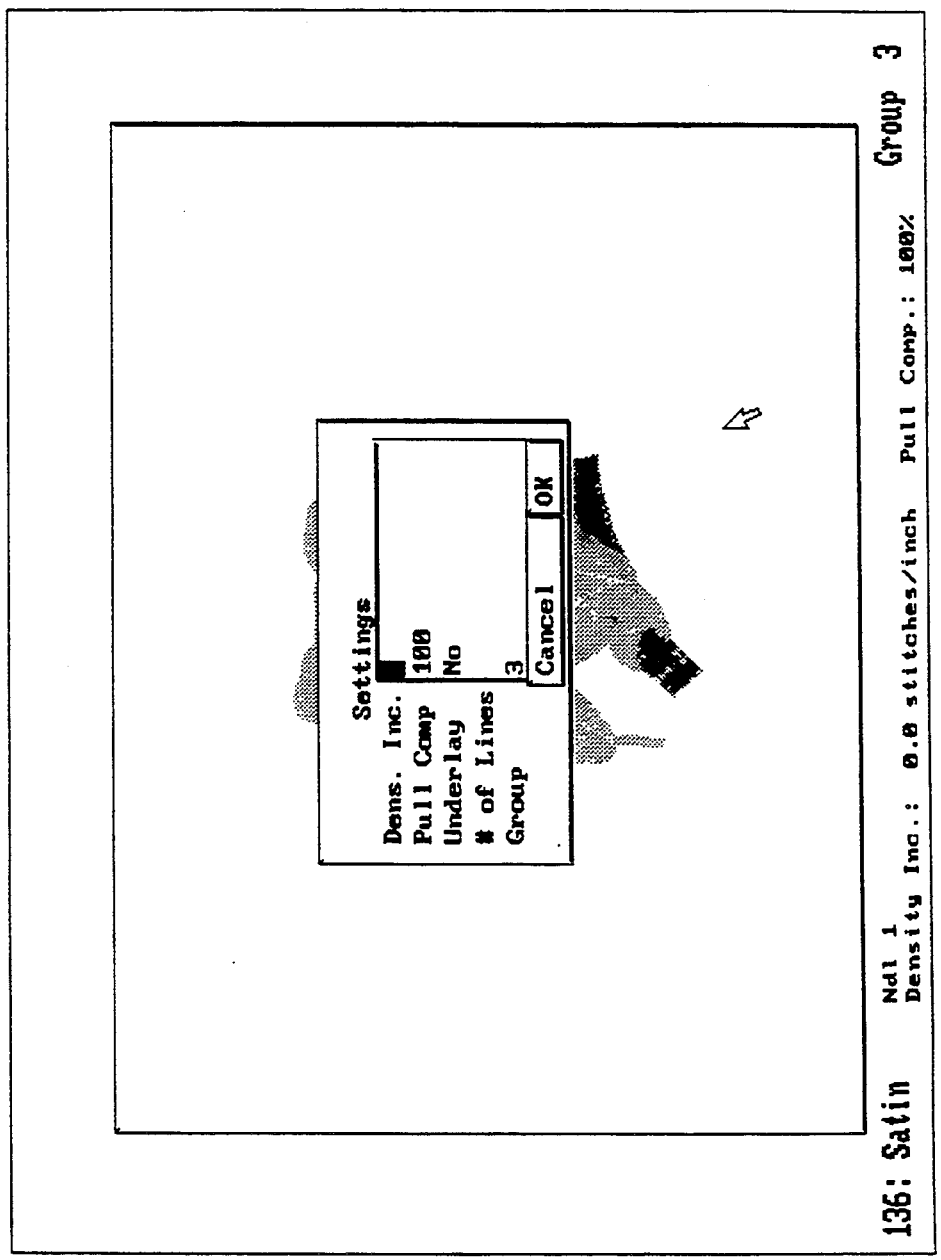
FIG. 6 shows the Satin Segment Setting screen of the embroidery design system of the present invention.

For a Satin segment, Satin from the Stitch Type menu would be chosen. The status line will change to provide information relevant to the selected stitch type, and a data box similar to that shown in FIG. 6 will appear. Satin stitches cover a region by going from one side of the region to the other without penetrating the fabric in between. If the distance from side to side is longer than the maximum stitch length, jump stitches are inserted in order to give the same effect as though it were one long stitch from one side to the other. In some situations this may result in an area with-loose threads that can be pulled inadvertently from the fabric.

The user would draw the outline of the region by going from one side of the area to be filled, to the other and pushing a predefined button. These 'stitches' which are being drawn should have two points each: one on one side of the area and one point on the other. As these points are being laid in, an outline will be drawn, indicating with straight lines approximately the outline of the region which will be filled in by stitches. Whenever a user finishes a Satin, Curve Satin, Tatami or Curve Tatami segment, the system preferably draws in stitches which approximate what the final stitches will look like.

While punching the design points, a user may always return to the Stitch Type Menu with a predefined key, for example to change the needle number or the stitch type. As this is done, the status line will change accordingly.

In almost all cases, when a user changes segments, the segments are not connected to each other. The system will move from the end of one segment to the beginning of the next with a direct stitch (a jump if necessary). The system preferably incudes a Switch function key which is used to Switch from doing a normal Satin or Tatami to doing a Curve Satin or Curve Tatami, or vice versa. It also preferably connects the user to the last two points of the segment being drawn. This function allows the user to carry on drawing the part of the design previously being worked on, but having switched into or out of a curve.

Figure 7:
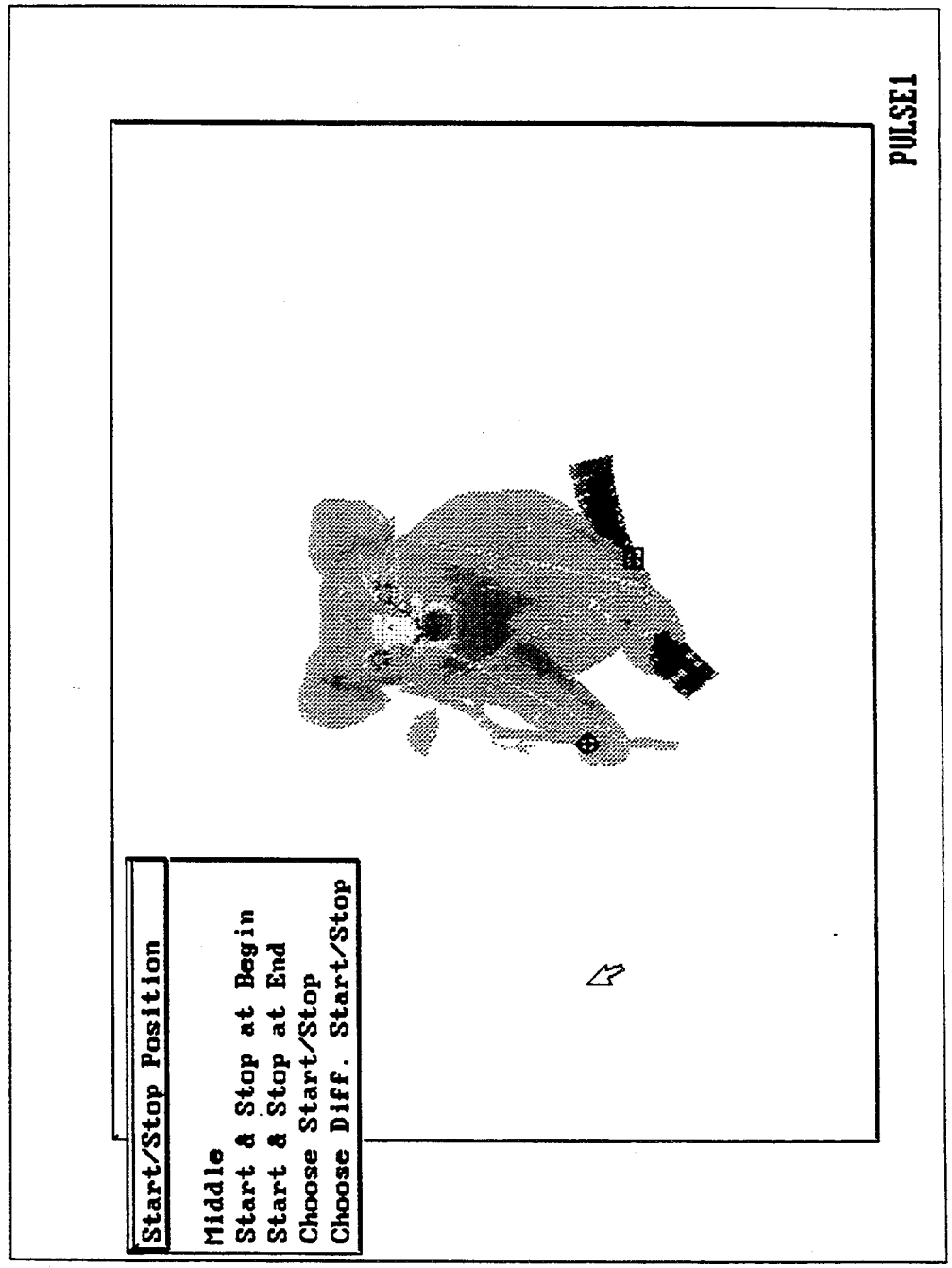
FIG. 7 shows the Start/Stop Menu of the embroidery design system of the present invention.

As shown in FIG. 7, a Start/Stop Menu is preferably provided for allowing the user to locate where the design is to start and end. Most of the time, it is preferable to start and stop the design in the middle, a center-start center-stop. If this is chosen, the system will calculate the middle of the design and start the design there, then jump to the beginning of the first segment, stitch the design, then jump from the end of the last segment back to the middle. Other options are described in further detail below.

Figure 8:
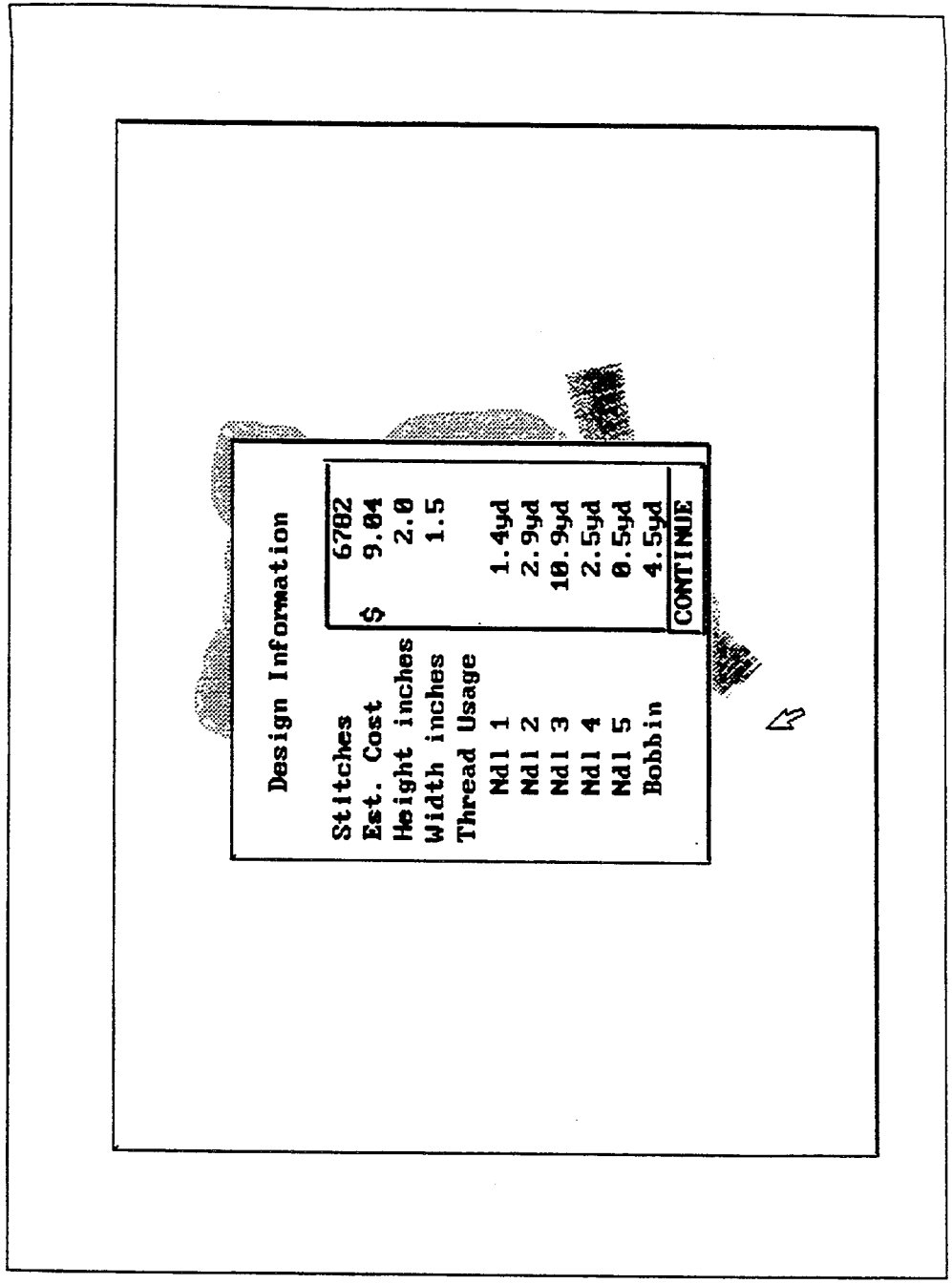
FIG. 8 shows a Design Information data box of the embroidery design system of the present invention.

The system now generates the stitches for the design at the size and density entered by the user. When it is finished, a Design Information data box is preferably displayed as shown in FIG. 8. This display contains information about the stitches generated: the stitch count, size, and approximate thread usage, for example.

The system will now preferably present the user with a menu asking whether the user would like to Edit the design, Output the design, or return to the Main Menu. Otherwise, choosing one of these items is like choosing Output or Edit from the Main Menu, as described below, except that the system automatically uses the file which was just made, so the user doesn't have to pick it from a menu.

The following Punch functions and Stitch types are preferably implemented by the system of the present invention.

(a) Done: 'Done' performs different actions depending on what a user is in the course of doing. When in the main Punch menu, Done preferably tells the system that a user is finished punching. A user will be asked to identify the Start/Stop position for the design and a user will be given the opportunity to Output or Edit the design.

If the user was drawing a segment, Done tells the system that this segment is finished and the user is ready to go on to the next. The user is then preferably given the main Punch menu again, so that a user can choose a new stitch type.

(b) Previous: Once a segment has been drawn, the main Punch menu changes slightly. The word 'Previous' is preferably added. This allows a user to return to the previous segment which was just completed.

(c) Re-Show: Selecting 'Re-show' preferably causes the system to clear the screen and re-show the current design.

(d) Fade: When a user is punching, the area in which the user may punch was preferably limited by the reference points that were entered at the outset of punching. If it is desired to punch outside this area, choosing Fade will preferably make the design smaller, and allowing the user to punch further outside the reference point area.

(e) Machine Commands: The commands required by the embroidery machines to produce a design are by and large generated automatically by the system. Periodically, however, a user may wish to insert special machine commands into a user design. These are available to a user by selecting 'Command' when a user is drawing a segment from the Settings menu. The user is then presented with a list of available machine functions.

(f) Electronic T-Square: When drawing a segment, no matter what stitch type, the user is preferably able to choose from a group of drawing tools called the "electronic T-square." These are preferably available from the Settings menu. The functions preferably include Up/Down, Left/Right, Connect, Erase.

If desired, these functions can be chosen directly, without going through the settings menu, by pressing predefined hotkeys. Selecting UP/DOWN will result in the next point drawn to be vertical of the previous point. Similarly, LEFT/RIGHT results in the next point being horizontal of the previous point. CONNECT will lay a point down at the same location as a point previously drawn that is near to the position of the cursor. ERASE will erase the last point a user entered. A user can keep pressing this until all the points in the segment are erased except for the first.

(g) Description of Line Stitch Types: The line stitch types preferably include Manual, Run, 2-Ply, Bean and NeedleUp. All of these have the effect of producing stitches along a line the user has drawn, but each does so in a slightly different manner.

(i) Manual: Stitches are generated so that the needle penetrates the fabric everywhere the user has indicated, but no where in between. If there is a long distance between button-pushes, jump stitches will automatically be added in order to produce the stitch.

(ii) Run: This is a more 'automatic' version of Manual stitches. Stitches are placed along the lines that the user draws at a set interval as well as at specific points where the user indicates. When the design is scaled up or down, the stitches are still generated at the interval that the user set when drawing the design. The setting of this interval or 'stitch length' is done by either using the current (or "default") value, or a user can change the Setting. The Stitch Length will keep this value until the user changes it again or starts a new design.

(iii) 2-Ply: This is the same as a Run stitch, except that after running along the line that the user drew, it will run back along the same line, at the same stitch length, ending where it started.

(iv) Bean (sometimes called 3-ply): This is the same as a Run stitch, except that the system puts in three stitches for every one that the user would have under Run. The stitches go back and forth three times to give a heavier run stitch.

(v) Needle Up: This is the same as Manual stitch, except that the needle never penetrates the fabric. It floats through the path that the user has drawn.

The following steps are preferably used for entering segments using Line Stitch Types:

1. Choose one of the line stitch types from the Stitch Type menu.

Figure 5:
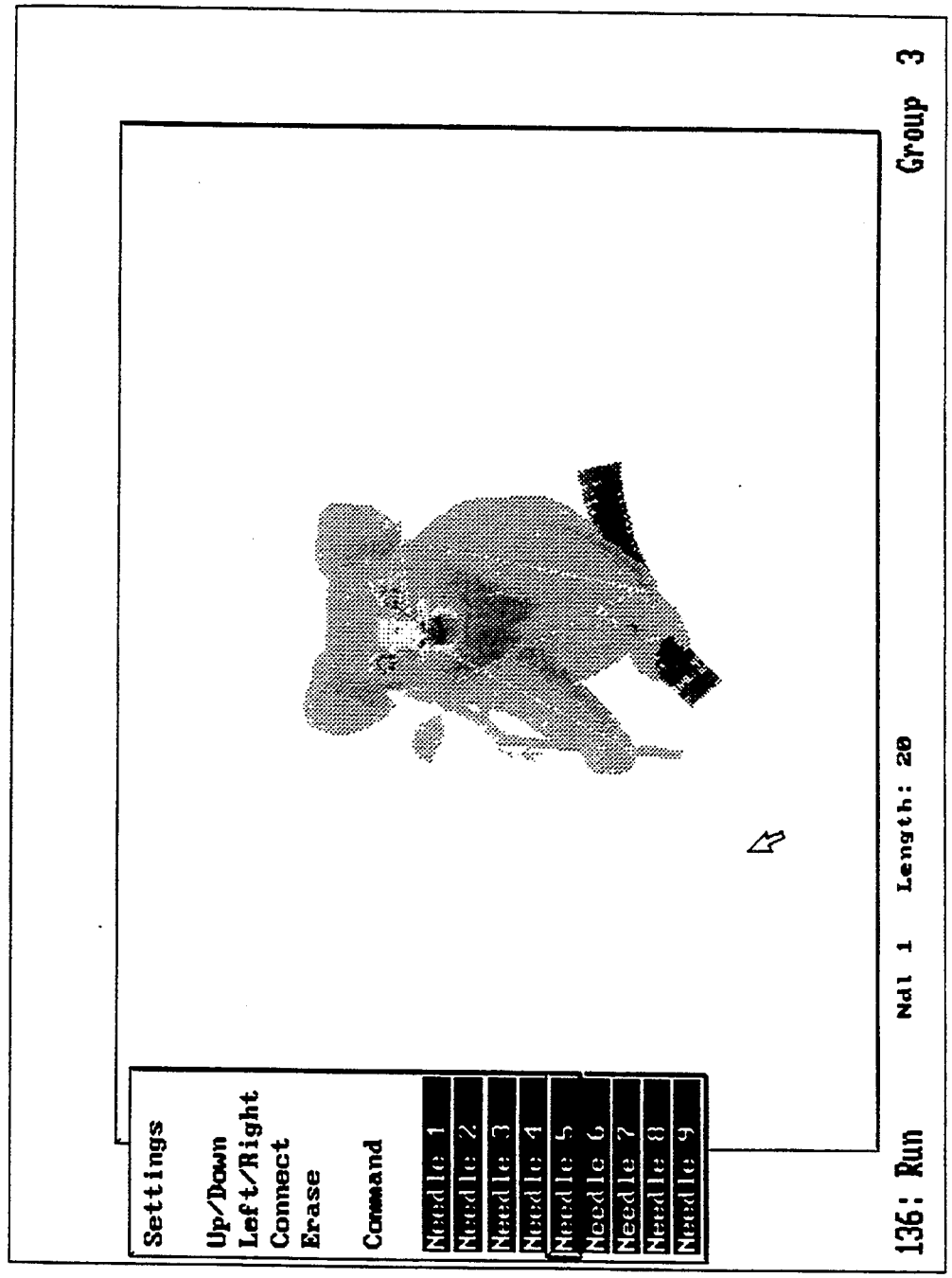
FIG. 5 shows the Settings Menu of the embroidery design system of the present invention.

2. Draw the segment. At any time while drawing, the user may press a predefined key on the keyboard to get the Settings menu as shown in FIG. 5. This will allow a user to change, for example, the stitch length, choose an electronic T-square item, set a special machine command, or change the needle number.

3. When finished drawing the segment, and the stitch length and the color are correct, end the segment by pressing a predefined keyboard key.

Region Type Stitches include Satin, Curved Satin, Tatami and Curved Tatami.

(i) Satin and Curved Satin are identical, but the outside of the region drawn with Curved Satin is made up of curved lines rather than straight lines. Satin stitches cover a region by going from one side of the region to the other without penetrating the fabric in between.

(ii) Tatami and Curved Tatami: As with Satin stitches, Tatami and Curved Tatami stitches are the same except that the outside of the region is curved in the latter case. Tatami stitches are also known as step stitches, geflect stitches, ceeded regions or fill stitches. Tatami stitches fill an area with stitches laid down in a pattern (sometimes a random pattern). The pattern is determined by setting 'offset' values to define the pattern which will result from these intermediate stitches. In order the avoid having all the intermediate stops align themselves into clear lines, the user must tell the system how far the stops on one stitch must be from the stops on the stitch above and below it. This is done simply by shifting the stops slightly to the right or left.

The offsets are percentages of the stitch length. For example, and offset of 25% will tell the system to make the first stop shifted by 25% of the stitch length. If desired, a random offset may be chosen, in which the system will automatically generate the offsets at random.

Tatami stitching is similar to satin stitches in that the stitch ultimately goes from point A on one side of a region to point B on the other side. On the way, however, it stops a number of times, the needle drops, and an intermediate stitch is laid. The frequency of these stops is referred to as the Stitch Length.

(iii) Geflect: These stitches are virtually identical to Tatami stitches except in two respects: a) These stitches are always parallel to each other, whereas Tatami stitches can turn and; 2) The method used to enter these stitches is different.

(iv) Boot Stitch: This stitch type produces a series of parallel run stitches. The width of the region is filled with run stitch lines evenly spaced. Therefore the number of lines selected defines the "density" of the region.

The following steps are preferably used for entering Satin Stitches:

1. Select Satin from the Stitch Type menu.

2. Draw the outline of the region by going from one side of the area to be filled to the other and pushing a predefined button. These 'stitches' that are being drawn should have two points each: one on one side of the area and one point on the other. As a user lay in these points, an outline will be drawn for a user, indicating with straight lines approximately the outline of the region which will be filled in by stitches. If desired, the segment may run over itself. For example, the FIG. '8' could be done as one segment. However, when actually punched, this can sometimes lead to needle breaks.

3. The angle of the stitches will be the angle of the lines the user is drawing. The stitches will preferably sweep from one angle to the next, every four points. That is, the first two points a user lay in determine the starting angle of the stitches for the segment. The stitches will flow gradually to the angle indicated by the next two points, and so on.

4. At any time while drawing a user may press a hotkey to get the Settings menu. This will allow the user to change the density, pull compensation or underlay, or choose an electronic T-square item, set a special machine command or change the color.

5. End the segment by either pressing a predefined key, or if it is desired to change to a Curved Satin, a different predefined key is pressed.

Entering Curved Satin segments is identical to Satin, except that the system will preferably generate a circular curve for every 3 points on each side of the area. That is, if the user draws 6 points, a curve will be formed from the three points on one side and from the 3 points on the other side. Similarly, the next 4 points will form an inside curve and an Outside curve from the new points as well as the previous 2 points.

When drawing Curve Satins and Curve Tatamis, the system counts which point is being drawn. This is preferably presented in the Status Line area. It counts like 1-2-3-4-5-6 then 3-4-5-6 then 3-4-5-6, etc.

Entering Tatami and Curved Tatami segments is identical to Satin and Curved Satin stitches, except that the user is preferably also asked to indicate the pattern, either by typing in the offsets or by pressing a function key to use one of the stored tatami patterns.

The following steps are preferably used for entering Geflect segments:

1. Geflect stitches are entered in a completely different way than Tatami stitches, but the resulting stitches are almost identical. A line is drawn around the outside of the area the user wants filled. It does not matter if the user draw clockwise or counterclockwise.

2. The user starts drawing the outline at the side closest to where the stitches should start.

3 The angle of the stitches is set in the Settings menu which is activated by a hotkey. This angle can also be changed in Outline Edit as described below.

To enter Boot Stitch segments, the points are preferably entered in a manner identical to Curve Satin. The boot region should preferably be "closed," ending at the same place as it begins. When the user is done, the region is filled in like a Curve Satin, but the stitches are later automatically generated like a proper Boot Stitch.

(h) Design Start-and-Stop: After the user has completed drawing the user-defined outlines (by selecting Done from the Stitch Type menu), a Design Start-and-Stop screen, as shown in FIG. 7, prompts the user to specify where the design should start and stop. The following menu items are preferably presented:

(i) Middle: The system will determine the precise center of the design. Jump stitches are generated to move out from the center of the design to the location of the first stitch in the design. At the end of the design, jumps are used to move back to the center of the design. There is preferably no penetration of the fabric at the beginning or end of these jumps.

(ii) Start-and-Stop at Begin: A square with a cross in it is preferably positioned on the screen at the location of the first stitch. Selecting this item will cause the system to start the design at this symbol and then add jumps to the end of the design to bring the needle back to the beginning (without penetrating the fabric).

(iii) Start-and-Stop at End: A circle with a cross in it is positioned to show the location of the last stitch in the design. Selecting this item will cause the system to start the design at this symbol, then jump to the location of the first stitch, without penetrating the fabric.

(iv) Choose Start/Stop: This allows the user to select a point for the design to start. The system will jump from this location to the first stitch. At the end of the design, the needle will jump back to the chosen location.

(v) Choose Different Start/Stop Positions: The user preferably chooses two points, start and stop positions. The system moves from the start position to the first stitch, and from the last stitch to the stop position.

(h) Text: Text or Monogramming is a utility which acts like a stitch type selected in Punch, in the same manner as the user might select Satin or Run, for example. The difference is that, unlike any other stitch type, the points, segments, and stitch types for the letters are retrieved from the hard disk, having been previously created. The letters are placed into the user design as though the user had drawn them, as normal outline points and segments. This allows editing in the normal fashion. The letters are preferably connected using a "closest point connection" or "trimless" technique.

There are preferably 9 types of Text Baselines on which the text or design may be implemented:

(i) Vertical: Letters are placed along a straight line drawn in any direction, with the letters always sitting vertically.

(ii) Rotate: Letters are placed along a straight line drawn in any direction, but they are rotated to sit on the line.

(iii) Arc: Letters are placed along an arc.

(iv) Circle: TWO strings of text are entered, one for the top of a circle, going clockwise, and one for the bottom, going counter-clockwise.

(v) Three-Letter: Three letters are placed on a line, with the two outside letters smaller than the middle letter.

(vi) Vertical Arc: The backs of the letters are vertical, but they are shaped to fit a specified area.

(vii) Bridge-Double: The tops and bottoms of the letters curve in to the middle.

(viii) Bridge-Flat Bottom: The bottom of the letters is flat, but the top arcs down.

(ix) Bridge-Flat Top: The top of the letters is flat, but the bottom arcs up.

After selecting Text while in Punch, the user preferably draws a line upon which the letters will be placed. For Vertical, Rotate, the 3-letter types, Vertical Arc and the Bridges, two points are preferably entered: the beginning and end of the line on which the letters are to be placed. For Arc, three points are used: one at the beginning of the arc; one anywhere in the middle of the arc; and one at the end of the arc.

For Circle, two points are preferably used: one at the Center of the circle, and one at the outside of the circle but at the center of the top string of letters. In other words, if the user wants the top letters centered around 12 o'clock and the bottom letters centered around 6 o'clock (which is the most likely), the user would put the second point at 12 o'clock. On the other hand, if the user want the letters around the sides of the circle, centered on, say, 9 o'clock and 3 o'clock, the second point would be at 9 o'clock.

Pressing a predetermined key allows the user to check the Text settings. Choosing Settings preferably gives the user a databox containing the following:

(a) Font Name: This gives a menu of "fonts" (i.e. typestyles) that are available on the system.

(b) Baseline: This is the style of text placement as described above (vertical, rotate, arc, circle).

(c) Justify: In all likelihood, the text to be retrieved will not exactly fit the user defined line (or arc) without some type of adjustment. This setting tells the system how to place the letters along the line. The choices are preferably:

Center: Center the letters on the line or arc. Even if the letters don't use the entire line or they are too big for the line, they will be centered on the center of the line.

Left: Start the letters on the left-most point of the line (i.e. the beginning), then continue along the line even though the text may be shorter or longer than the line.

Fill Box: This option will cause the letters to exactly fit on the line or arc. If the letters would normally be too wide for the line, they are made more narrow in order to fit. If the letters would not other-wise fill the entire line, they are made more wide until they fit. The height of the letters preferably remains as specified, i.e. the text is not adjusted proportionately, Fill Baseline: This option is similar to Fill Box, except that the letter sizes are adjusted proportionately. The entire letters are made bigger if the string of letters does not fill the line, or smaller if the string of letters is too big for the line.

Height: The height can preferably be specified in 2 ways: the user can enter a height in the Settings databox; OR it can be set by entering a an extra point while defining the baseline, as described below. All other letters are preferably scaled accordingly.

(e) Spacing: This selection allows the user to adjust the overall spacing between all letters. A value of 0 means don't make any special adjustment to the spacing. A negative number preferably will force the letters to be closer together. A positive number preferably spreads the letters out.

(f) Slant Angle: The Slant Angle is used to slant the letters to give an italic effect. A positive number slants them forward (like italics), a negative number will slant the letters backward.

(g) Bridge Rise: This is the percentage of the height that the letters will arc in on a Bridge baseline.

Adjust Width: This option is preferably for special effects, forcing the letters to be wider or narrower. It will only have an effect if the Justify is not set to Fill Box. This is preferably a percentage number, where 100% is normal. Smaller numbers make the letters narrower, bigger makes them wider.

(i) Satin as Tatami: All the letters in the fonts are preferably punched with Satins and without Tatamis. This parameter is preferably used if the letters are going to be large. It will force all Satins to be turned into Tatamis, using the pattern specified below.

(j) Activate Trim: If this option is set to Yes, then trimmers will be activated between letters according to the parameter as set below.

(k) Trim Between: This parameter is preferably a distance in millimeters used to determine whether trim commands should be inserted between the letters. If the number is negative (the default is $-1$), then trims will never be put between the letters. If the user sets a positive number, though, any pair of letters with a connection longer than that number will have a trim inserted. For example, if the user set this to 2 mm, then if a connection from one letter to another is more than 2 mm, a trim command will be inserted before the connecting stitch.

(l) Furthest Point: This threshold distance is preferably a distance in millimeters used to determine whether the closest point connection between letters should be used, or whether the longest available connection should be used. The user might set this if there are no thread trimmers on the embroidery machines, thereby making the connections between some letters longer to facilitate manual trimming. A setting of $-1$ causes this parameter to be ignored. It is unlikely that the user would set both "Trim Between" and "Furthest Point," since one is used where trimmers are available and the other is used where none are available.

(m) Length: This is the stitch length for Run stitches in the letters.

(n) Lock Between Letters: If the user enters 'Yes,' then a locking stitch is preferably placed at the end of all letters. If the user enters 'No,' then a Lock is placed only at the end of words.

(o) Pattern: This is the fill pattern to be used if the user has chosen to convert Satins to Tatamis.

(p) Density Increment: This is a density change parameter. Ordinarily, the density will be lessened on small letters.

(q) Pull Compensation: The user may enter a Pull Compensation parameter.

(r) Underlay and number of Lines: The user may enter an Underlay style for automatic underlays.

(s) Group: This is the group number for all the segments in a particular text session. This number is preferably automatically incremented for the user, but may be changed by the user, if desired.

As mentioned above, there are preferably two ways to set the height of the letters. The first is to use the height parameter in the Settings databox. Alternatively, the height may be set from the text draft made by the user by adding an extra point to the baseline. For example, in a Rotate or Vertical text, this line normally has 2 points. The user can add a third point to specify the height of the letters. The height will be the length of the line from the second to the third point, regardless of the direction this line is drawn.

Similarly, for an arc the user would add a fourth point to the normal 3 points. The height will be the distance from the third to the fourth point. Finally, for circles, a third point is added.

The length of the extra line is preferably made into the default height. If the user wants all letters in the design to have the same height, using the extra point for the first one will automatically set subsequent text to the same height.

The Spacing parameter in the Settings menu will adjust the spacing between all letters in the text. If the user only wants to adjust the spacing between given pairs of letters "kerning marks" are preferably used. The symbol '<' in the text will move the letter one "em" to the left. An "em" is a typographical term which, in this case, means 1/20th of the width of the letter 'M.' If the user want to move a letter farther to the right, the symbol '>' is preferably used. If desired, the user can use more than one of these at a time. So, for example, the user might type "Mono<<<gram." It is possible, by adding enough of these kerning marks, to place a letter on top of another.

The present system provides several types of Output. Outputting the design refers to two different things:

Generating or re-generating the stitches of a design from the outlines.

Sending stitches to a plotter, disk, paper tape or other conventionally known storage media for use by an embroidery machine.

Both of these types of functions are preferably performed by the Output function on the Main Menu. The user may also get to this menu after having Punched a design. In that case, after the stitches have been generated, the user is shown a menu allowing the user to either Output or Edit. Choosing Output gives the user the Output Menu.

The distinction between Outlines and Stitches is very important. Generally, outputting to tapes, disks and a plotter uses the Stitch file. Certain embroidery machines, however, operate on outline files. The present invention may output outline files, if desired. Using the Change Design Settings menu, an Outline file may be used to produce a Stitch file.

Figure 9:
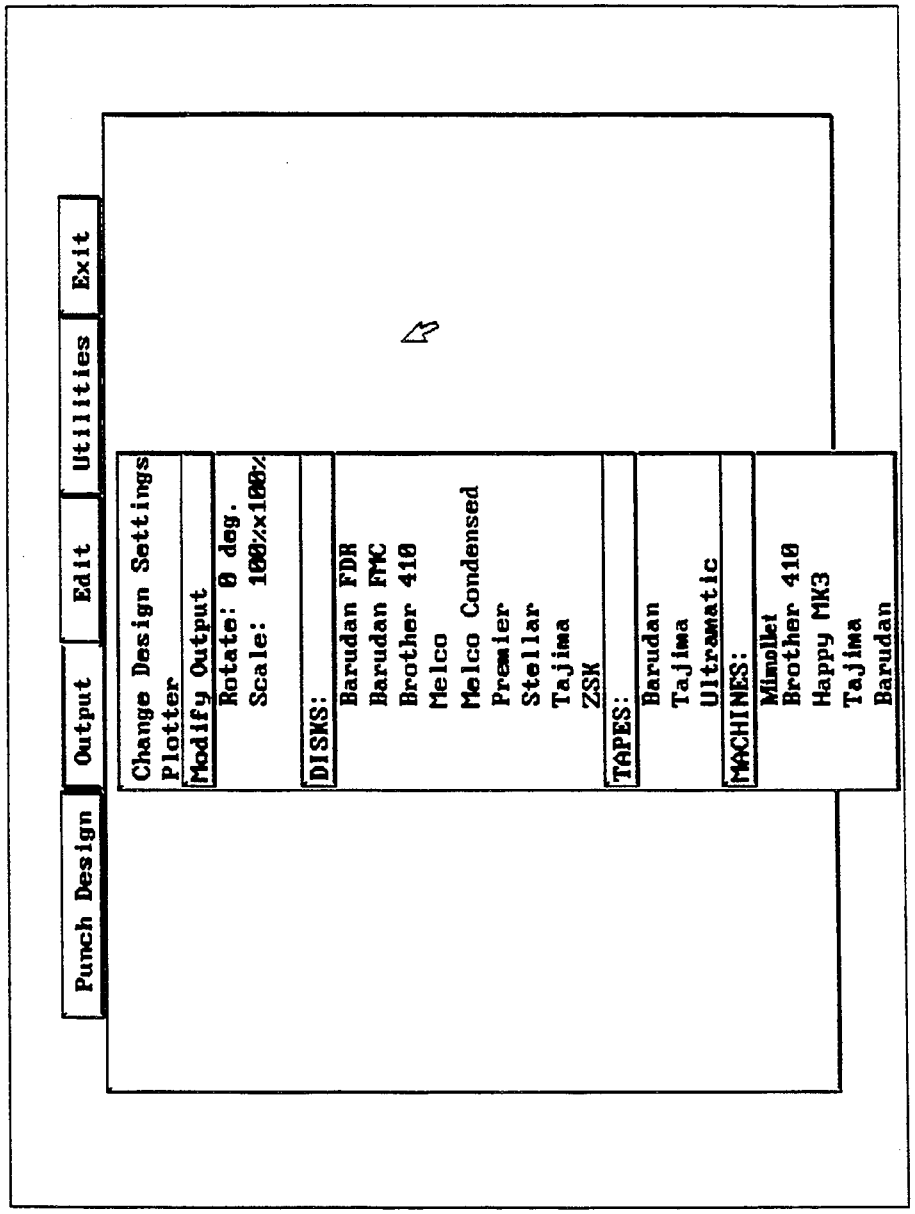
FIG. 9 shows the Output Menu of the embroidery design system of the present invention.

The Output menu, as shown in FIG. 9, preferably includes the following options:

(a) Change Design Settings: (Re-Generating the Stitches)

1. After choosing "Change Design Settings" from the Output or Edit menu, the user is preferably given a menu which is a list of Outline files. The user chooses the Outline file to work with.

The user is preferably given an Output Parameters data box. This is identical to the one used when creating the design with the following differences:

(a) The file name that the user enters is the name for the Stitch file that will be created. If the user wants different sets of stitches on the disk for the same outlines, perhaps having different sizes or densities, different filenames may be used.

(b) The user is preferably asked to specify whether Tatami regions should be treated as Satins. This option is specifically for designs wherein shrinking is a problem. A design that was originally drawn to be large (and so it included a number of tatami regions) but has now been made small, should not have tatami regions anymore. Entering 'Yes' will temporarily convert those segments into satin or curve satin stitches.

(c) The user is preferably asked about design Reference Points. The default is to Use the Old Reference Points, namely those entered when the design was drawn. Instead the user could choose to Ignore the Reference Points. In this case, sizing of the design will not be based on the reference points but rather on the actual limits of the design as the user drew it. Finally, the user could choose to Enter New Reference Points, in which case these will be used for the sizing of the design.

3. Once the Output Parameters data box has been completed, the system will generate the Stitch file.

(b) Output to Plotter, Disk or Paper Tape: If the user chooses from the Output Menu to output to the plotter, disk, or paper tape, the user is given a menu of Stitch files.

The procedure is preferably as follows:

1. The user chooses one of the Stitch files.
2. The system will draw the design on the screen and ask the user if this is the correct file. If not, the system will return the Main Menu.
3. If the user is Outputting to Plotter, the user is asked to provide a scale for plotting, then to prepare the plotter and to indicate when ready.
4. If the user is Outputting to paper tape, the user is asked whether the tape should be punched forward out the punch unit, or backward (so the user can wind the tape as it comes out), or the user may cancel and return to the Main Menu. If cancel is not selected, the tape is automatically produced.
5. If the user is making a disk, some disk formats require a file name for the disk. In this case, a data box will appear, for the user to enter a file name. The user is then asked to insert the diskette into the correct drive and to indicate when ready. The diskette is then made, if the user has not cancelled.

The Edit menu of the present system is capable of editing either Stitches or Outlines. In addition, the Edit function has several special procedures: Change Design Settings, Load Tape/Disk, Re-build, Stitches→Outlines, Condensed→Outlines.

It is generally preferable to perform Outline editing, rather than Stitch editing. This is because if the user changes the design parameters and regenerates the stitches for a design (perhaps to make it a new size or density), changes made with Stitch editing will not be reflected in the new design. Outline edits, however, will be incorporated into the new design. There are times, however, when stitch editing is appropriate, i.e., when all a design needs is a few adjustments to some stitches.

Also, if a stitched design without an outline was read into the system, then Stitch edit should be used unless the user is changing the size of the design.

Figure 11:
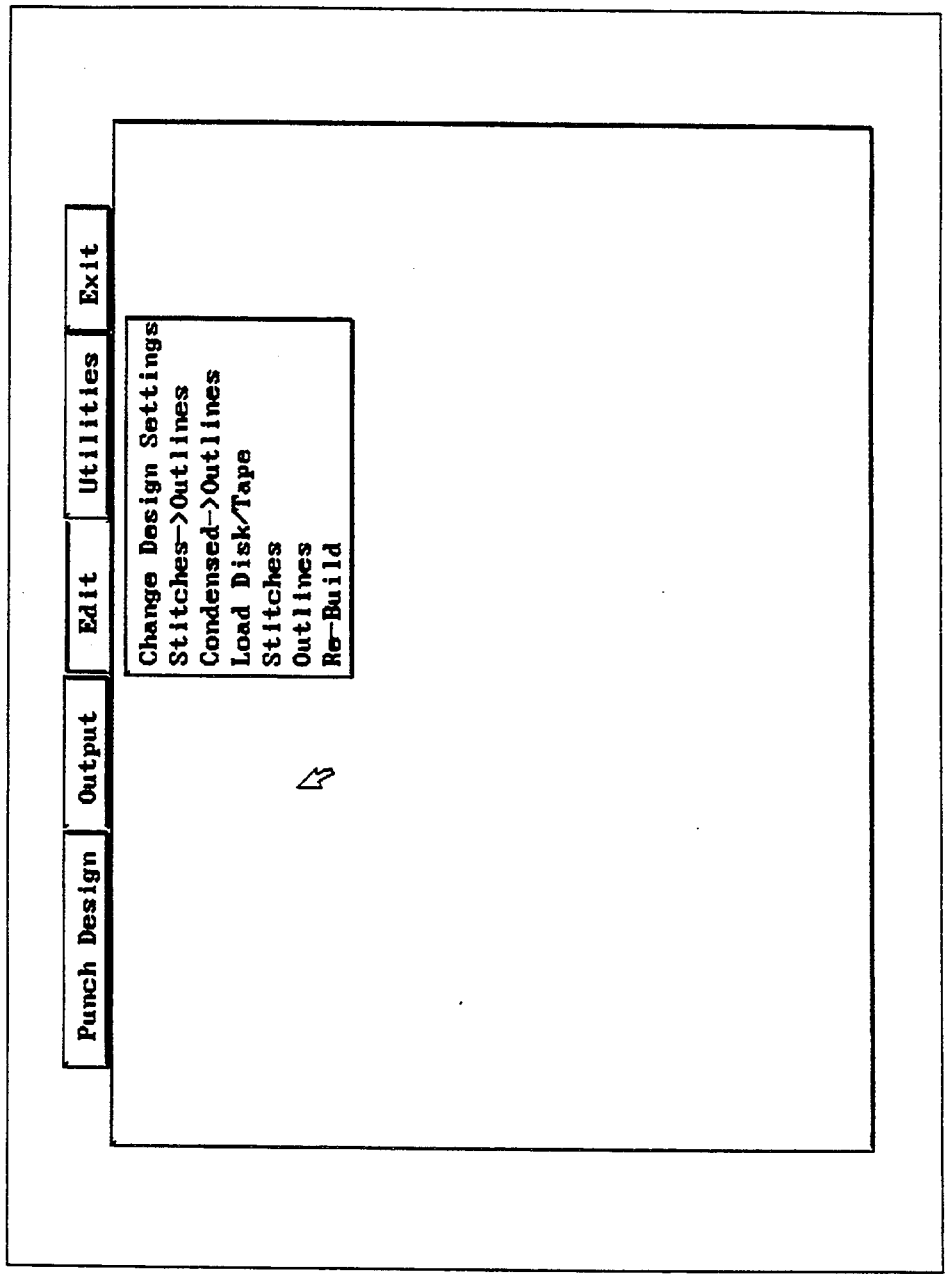
FIG. 11 shows the Edit Menu of the embroidery design system of the present invention.

To go into any of these editing functions, the Edit menu, as shown in FIG. 11, is preferably chosen from the Main Menu:

(a) Change Design Settings: This is preferably the exact same function available under the Output menu.

(b) Load Tape/Disk: This function allows the user to read existing stitch design made by a different punch system into the present system. The design is stored as a Stitch file and can therefore be edited using Stitch Edit, and Output to any of the standard formats. When this function is selected, the user is asked to select an Input Media, i.e. some kind of tape or disk. The design is then loaded, and the user prompted for a file name for the system to store the design.

(c) Re-build: This function is used when some of the disk files related to a design created on the present system have either been erased or corrupted. "Re-building" takes the Outline file and builds other required files from it. The user is given a list of Outline files. Selecting one will cause the re-build process to automatically proceed.

(d) Condensed→Outlines: This function is for converting MELCO condensed files to outline files compatible with the present system. This function is preferably automatically used when reading Melco condensed files from disks.

Figure 12:
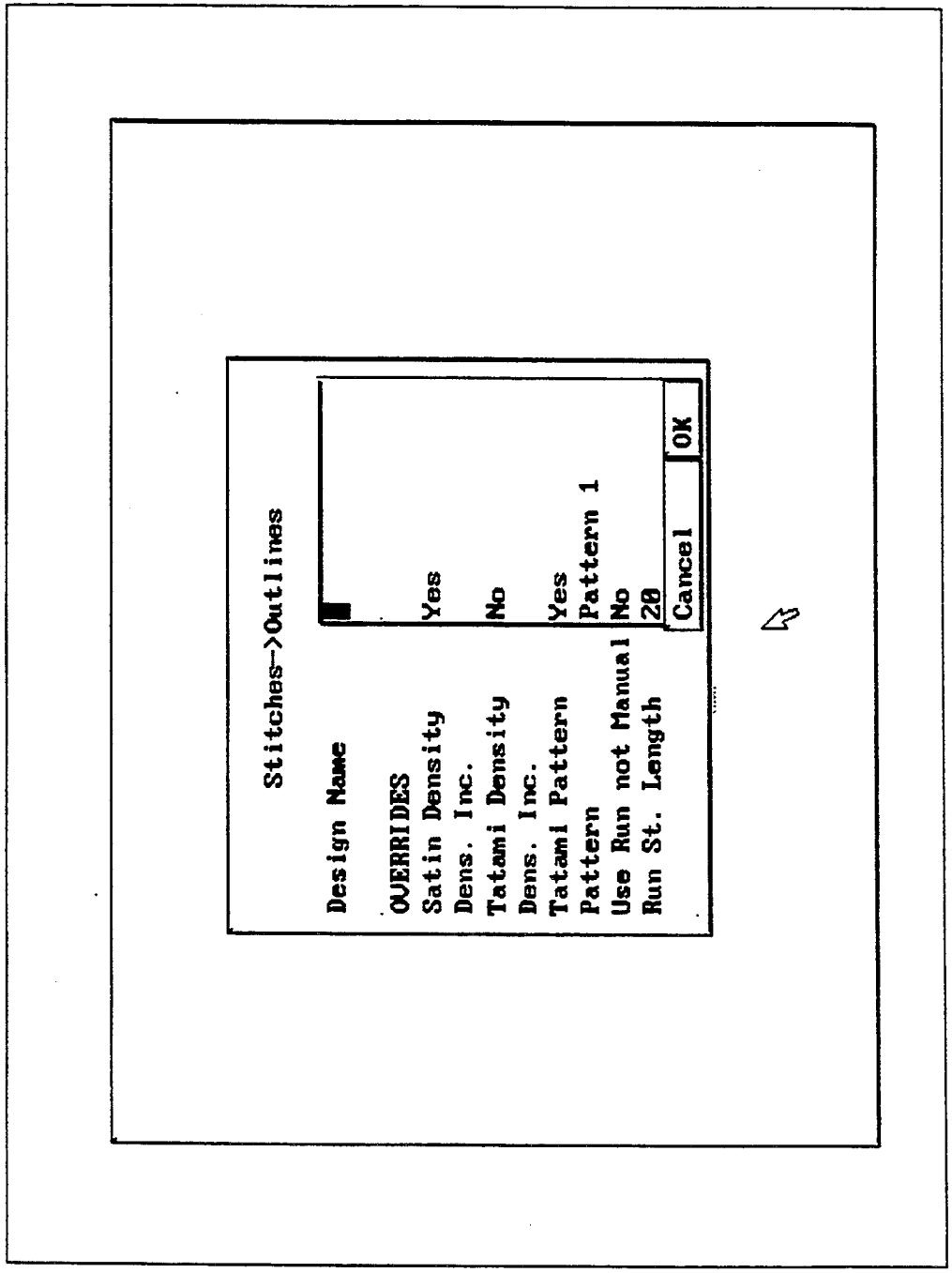
FIG. 12 shows the Stitches→Outlines Menu of the embroidery design system of the present invention.

(e) Stitches→Outlines: These menu functions, as shown in FIG. 12, preferably analyze stitched designs and attempt to determine Outlines that the original puncher may have used to create the design. Once converted to Outlines, Outline Editing and Change Design Settings may be used, just as with any Outlines that were created on the present system.

When this function is selected, the user is given a list of Stitch files to choose from. The selected design is displayed on the screen. The user is then presented with a databox to provide the name for the Outline file. Additionally, the user is prompted for "Overrides" for the conversion. These refer to whether the computer should attempt to determine certain settings or whether these should be provided by the user.

For example, if the user says 'No' to Satin Density, the computer will not override the density it finds in the design. Instead, it will calculate the density based on the stitching. The system then analyzes the design and creates the Outlines. Finally, the system goes immediately to Outline editing so that the: user can examine the outlines just inputted, and do any necessary editing.

Outline Editing allows the user to modify the points, segments, and groups of segments that were entered when drawing (punching) a design. For example, Outlines may be moved, deleted and inserted. When Outline Edit is chosen, a list of Outline files is preferably given. The user chooses the file to edit, which is displayed, and is shown the Outline Edit Menu.

The user must first select the point which is to be edited, the so-called Active Point. Every Point in the design is in one segment or another. As soon as the user has indicated which point to edit, the system automatically knows which segment to edit. Similarly, every segment in the design is in one group or another. Thus, by selecting a particular point, the system will know the Point, Segment and Group which is being edited.

Figure 13:
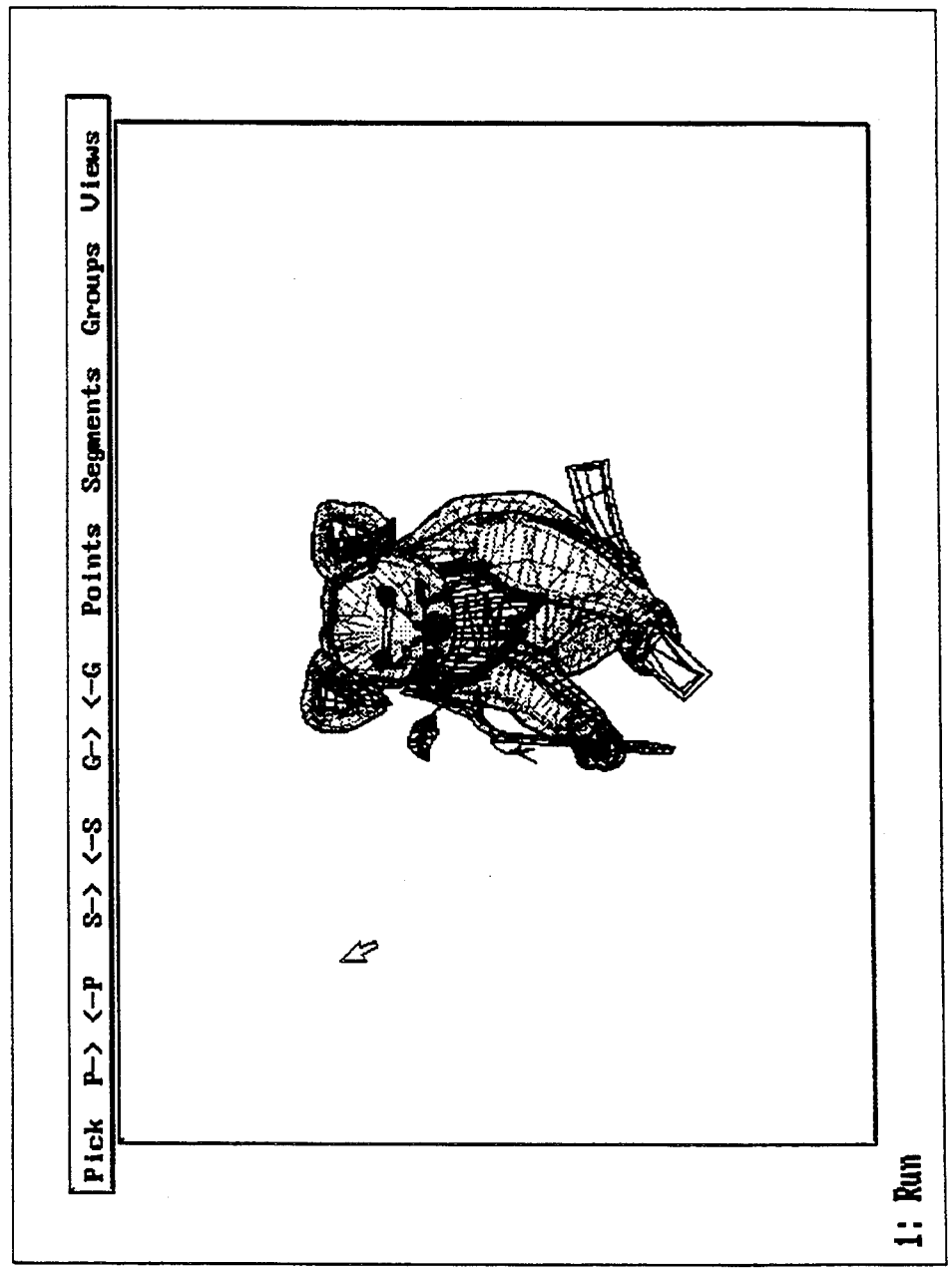
FIG. 13 shows the options screen for selecting objects to edit in the embroidery design system of the present invention.

The system preferably marks the point the user is working on with a symbol. As soon as the user begins Outline editing, the system marks the very first Outline point. In many cases, of course this is not the point the user wishes to edit. The user may use the Pick, P→, ←P, S→, ←S, G→, ←G functions, as shown in FIG. 13.

When editing is finished, i.e. a particular key pressed, the user is prompted to save the Outline edits. If the changes are saved, the stitch file is preferably regenerated automatically at the size and density last used. The user is given the opportunity to save the new outlines under a different file name, thereby keeping the old version of the design. If the file already exists, the user is warned and given an opportunity to cancel.

(a) Picking a Point: This function allows the user to select which outline point to edit. After selecting Pick from the Outline Edit Menu, the cursor is moved close to the desired point by keyboard or mouse, and a button pushed. The system will search the area and indicate the Active Point. To assist in the selection of the desired point, the Zoom and Dots functions, as described below, may be used. P→, ←P, S→, ←S, G→, ←G: If the wrong point was selected, the 'P→' and '←P' functions may be used. By pressing predetermined keys, the cursor will move to the next or previous outline points which becomes the Active Point. These functions may be repetitively selected until the correct point has been selected.

Similarly, S→ and ←S keys move the user from Segment to Segment forward or backward in the design. Using these functions, the Active Point is automatically changed to be the first point in this segment. Also, the Status Line is updated to reflect the settings of the Active segment.

Finally, G→ and ←G keys move the user from Group to Group. Group numbers have nothing to do with the order in which a design is sewn. These functions just move the user from lower group number to higher group number and vice versa. The active segment becomes the first segment in the group and the active point becomes the first point in that segment.

Figure 14:
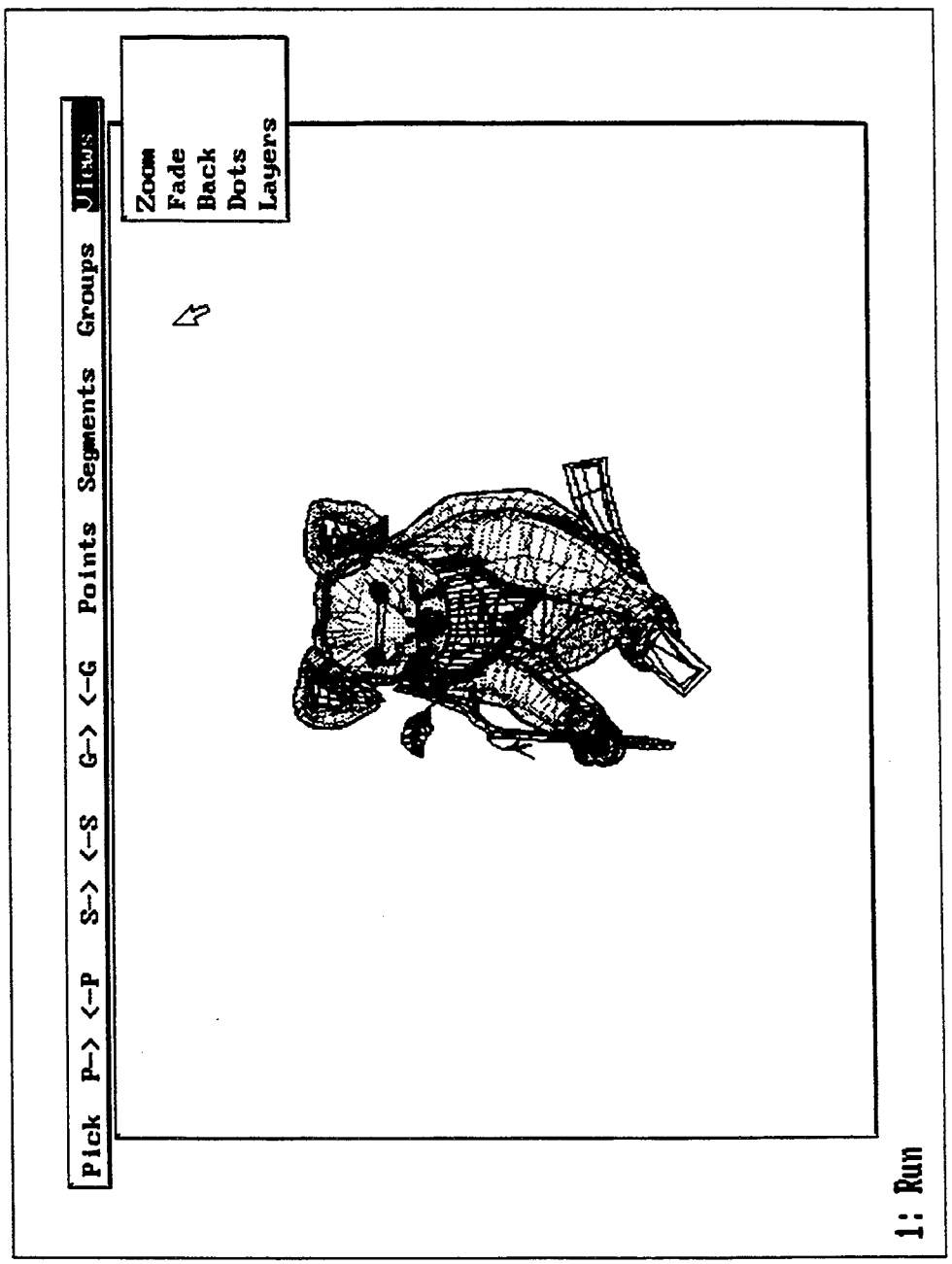
FIG. 14 shows the Views Menu of the embroidery design system of the present invention.

The views menu is shown in FIG. 14.

(c) Views-Zoom: The Zoom function allows the user to zoom in on an area to assist in the editing of the design. To perform a zoom the user is prompted for the upper left corner of the area to zoom. A 'rubber-band' box which pivots on that corner, preferably enables the user to indicate the remaining area to zoom. A predetermined button enlarges the zoomed area to fill the working area of the screen.

(d) Views-Fade: Fading pushes the design back into the screen, making it smaller on the screen than it was. This is useful if trying to move a point to be outside of the area shown on the screen. Fade can be chosen repeatedly, each time pushing the design further and further back into the screen.

(e) Views-Back: This function 'unzooms' the design. It clears the screen and takes the user back to the original size displayed on the screen after first entering the Edit session.

(f) Views-Dots: This function highlights the location of the outline points. It places a symbol everywhere a point was indicated when drawing the design to assist picking points.

Figure 15:
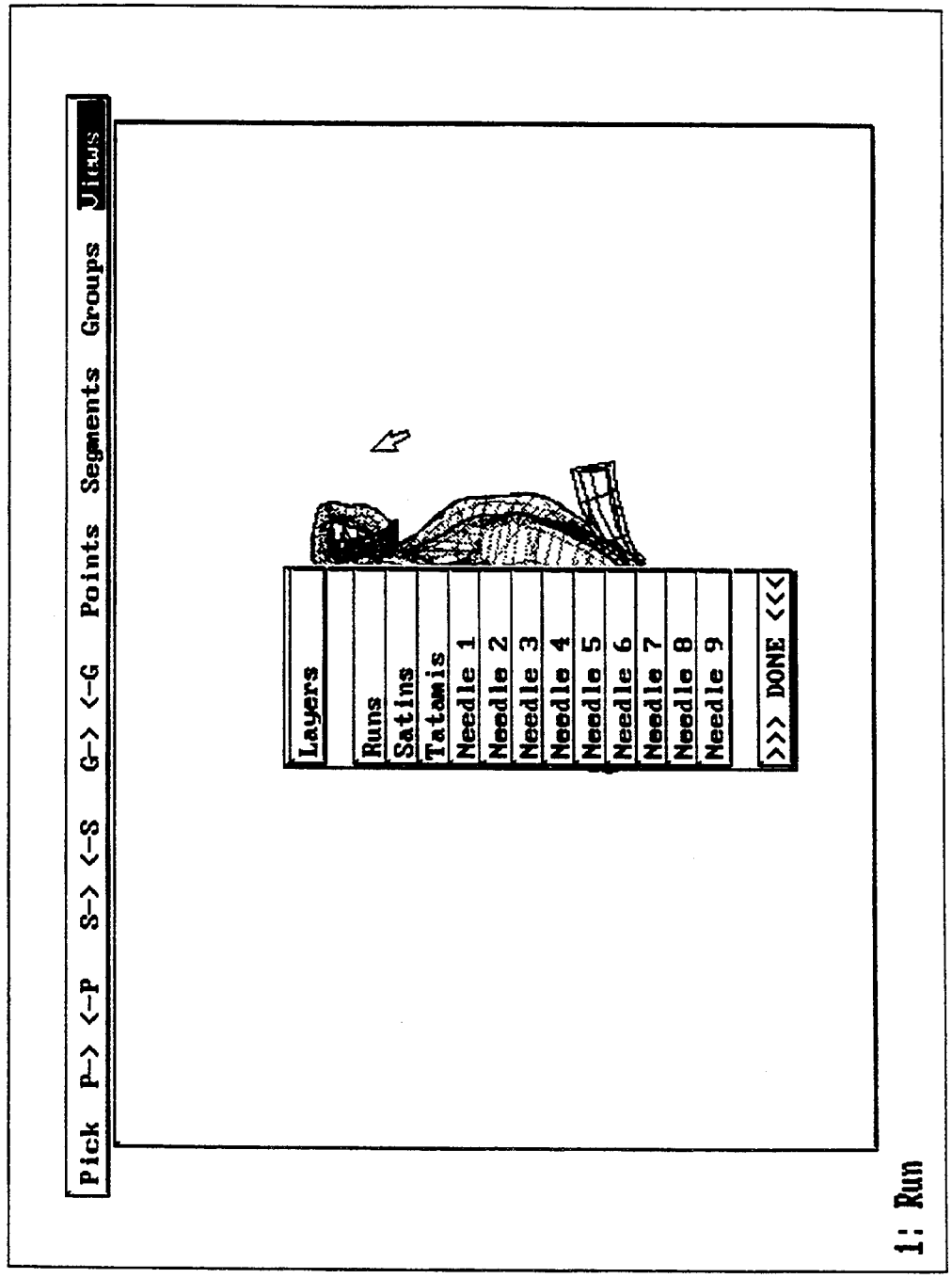
FIG. 15 shows the Layers Menu of the embroidery design system of the present invention.

(g) Views-Layers: When all the segments in a design are displayed on the screen at once, the user may find it difficult to visualize some of the fill and satin areas (because of the run stitches underneath). Also, the user may find it difficult to pick some points when there are overlapping segments. For these reasons, the Layers function shows the user a menu as shown in FIG. 15. By picking any one or more of the items, those items are turned off. When the user selects Done, the design is redrawn without the items the user has turned off.

Figure 16:
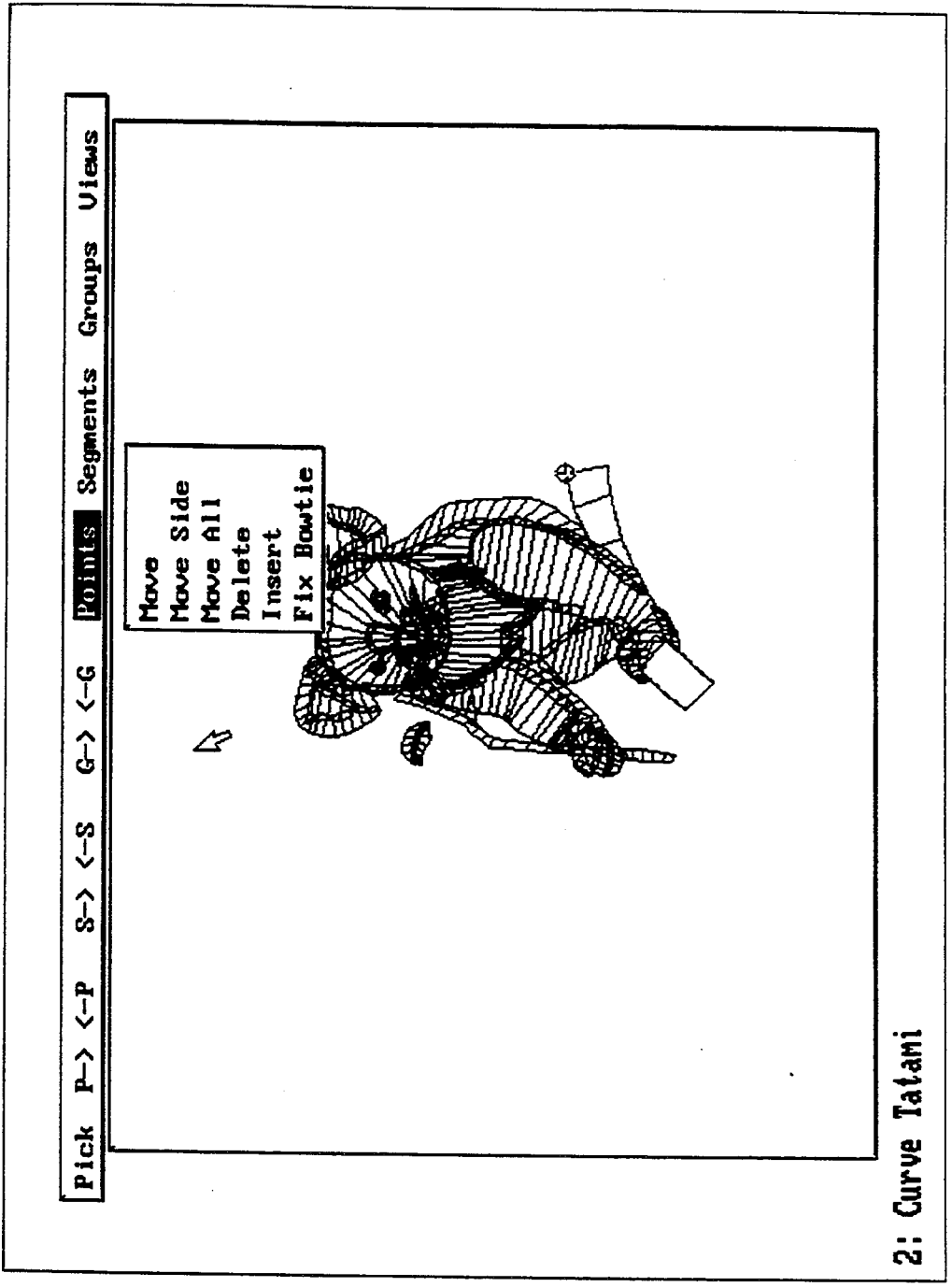
FIG. 16 shows the Points Editing Menu of the embroidery design system of the present invention.

The present system includes a variety of functions for editing points, as shown in FIG. 16:

(a) Points-Move: After selecting this function, the user is prompted to choose a new location for the Active Point. Once the new point has been selected, the segment in which the point occurs will be re-drawn to account for the move. Optionally, the user may choose whether the outline of the segment should be "rubber-banded" while the new point location is being chosen.

(b) Points-Move Side: This function is like Points--Move, except that after the user has placed a point, the system goes on to move the next point on the side (2 points later in the design). This is useful for Satin and Tatami segments, or to change a Run into Satin.

(c) Points-Move All: This function is for Run and Geflect segments. It is like Points-Move, except that as soon as the user has placed a point, it goes on to move the next point in the segment. This is also useful to change a Run into a Satin; the user can first move every second point to be on the opposite side, then convert the segment to Satin.

(d) Points-Delete: This function deletes the Active Point, then re-draws the segment. The Active Point becomes the next outline point.

(e) Points-Insert: This function inserts a point after the Active Point. The user is prompted to pick a location for the new point. Once chosen, the segment in which the point occurs will be re-drawn. The new point becomes the Active Point.

Figure 17:
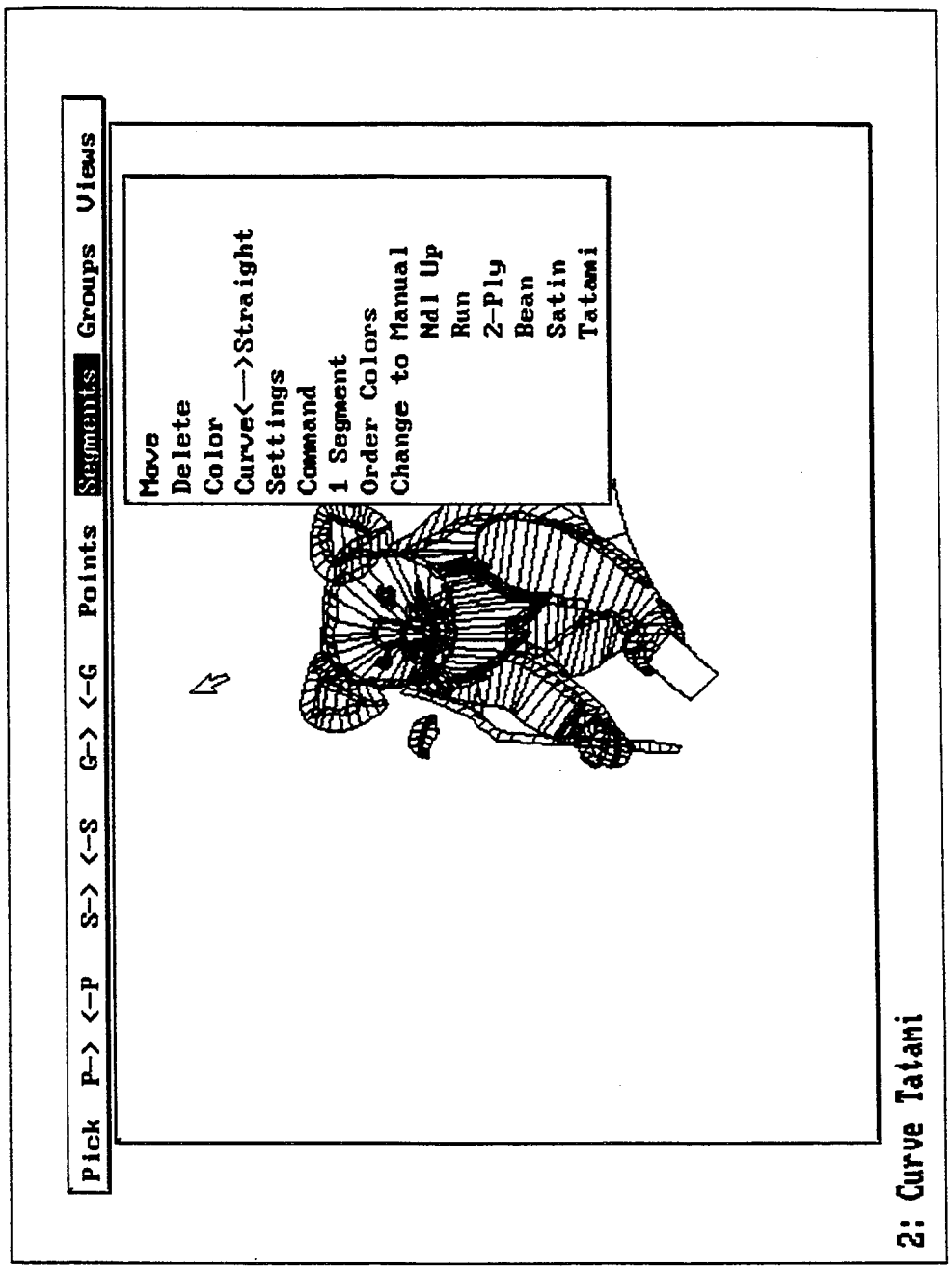
FIG. 17 shows the Segments Editing Menu of the embroidery design system of the present invention.

Segment Editing allows the user to modify groups of points that the user entered when drawing (punching) a design. In order to edit a Segment the user must first let the system know which segment to edit, the Active Segment. The user may use the Pick, S→, and ←S functions to choose a different Active Segment. As shown in FIG. 17, the following Segments functions are preferably available:

(a) Segments-Move: The user is prompted to pick a new location for the Active Segment. The new location is the location of the first point in the segment. Once chosen, the segment will be re-drawn to account for the move.

(b) Segments-Delete: This function deletes the Active Segment. The Active Segment becomes the next segment.

(c) Segments-Color: This function will change the color of the Active Segment. The user is given a list of needle numbers and prompted to select the desired needle number.

(d) Segments-Curve ⟷ Straight: This function is used to either change a Satin or Tatami into a Curve Satin or Curve Tatami, and vice versa.

Figure 18:
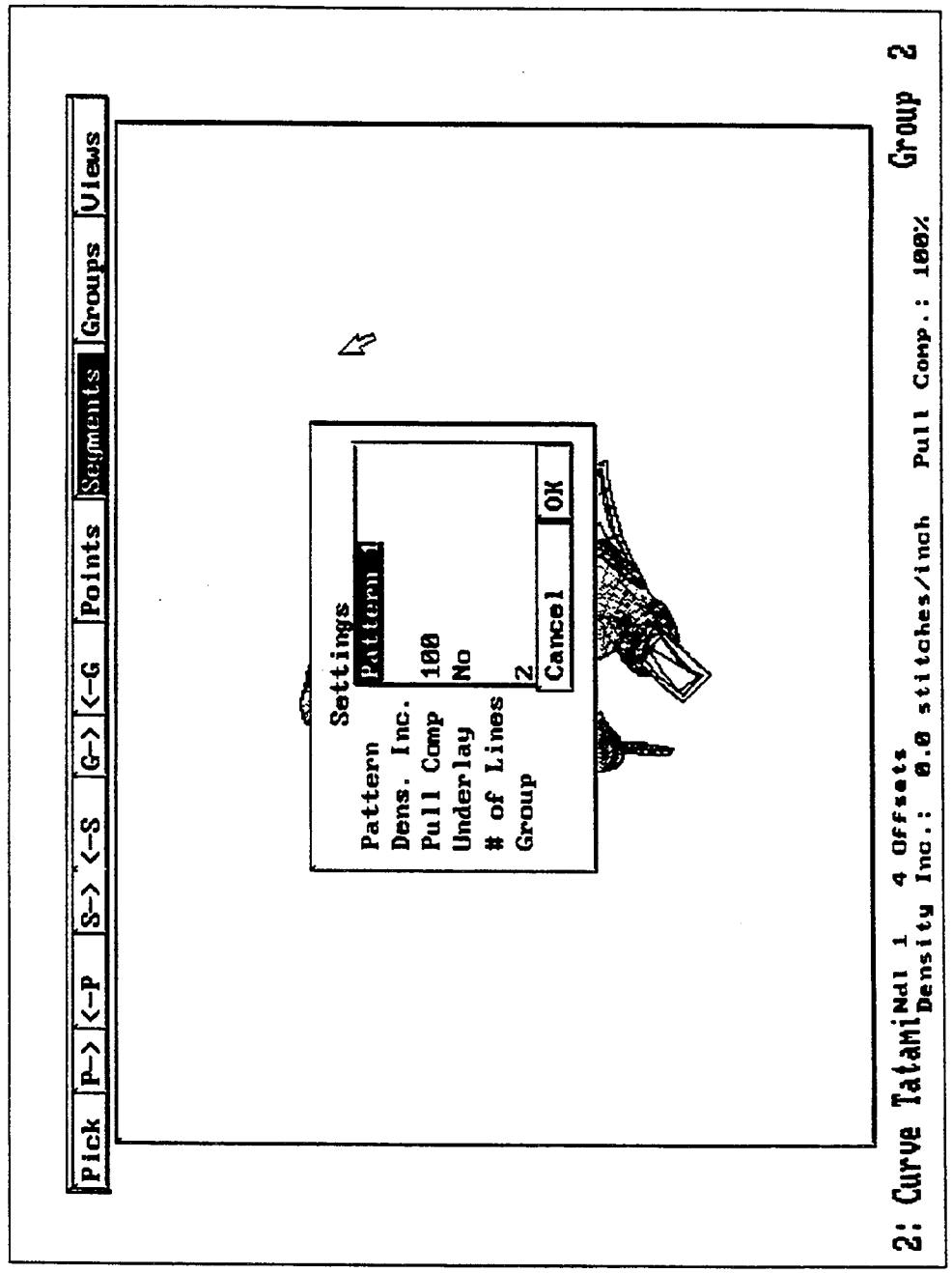
FIG. 18 shows the Segments Settings screen of the embroidery design system of the present invention.

(e) Segments-Settings: The user is presented with a Settings data box, as shown in FIG. 18. The data box will display the current settings, which may be changed for the Active Segment.

(f) Segments-Command: This function allows the user to change any special machine commands associated with a segment. For example, the user could add a trim, or a stop to the end of the segment, or remove a previously inserted command.

(g) Segments-1 Segment & Order Colors: This function is used to re-sequence the segments in a design. The user can choose to re-sequence only one segment, or the user can have all the segments re-sequenced in order of color. "1 Segment" re-sequencing is very useful if the user forgot to draw a segment in the middle of the design. In that case, the user would select Punch and add the segment to the end of the design. Then a 1-Segment Order in Segment Edit would move the segment to be in the correct sequence.

The "Colors" re-sequencing is useful if the user digitized the design in a somewhat random order, but now wishes all segments of each needle to be stitched at the same time. The system re-orders the segments so that all of the Needle 1 segments come first, then Needle 2, etc.

(h) Segments-Change to . . . : This series of functions allows the user to change the actual Stitch Type of a segment. For example, if a segment was originally a Satin, but the user would like it to be a Tatami, the user would choose "Change to Tatami." This is particularly useful if the user has used the Stitch to Outline Conversion function. The system may have, for example, misinterpreted a segment and made it into a Run stitch, when it appears to the user to be a Satin.

Figure 19:
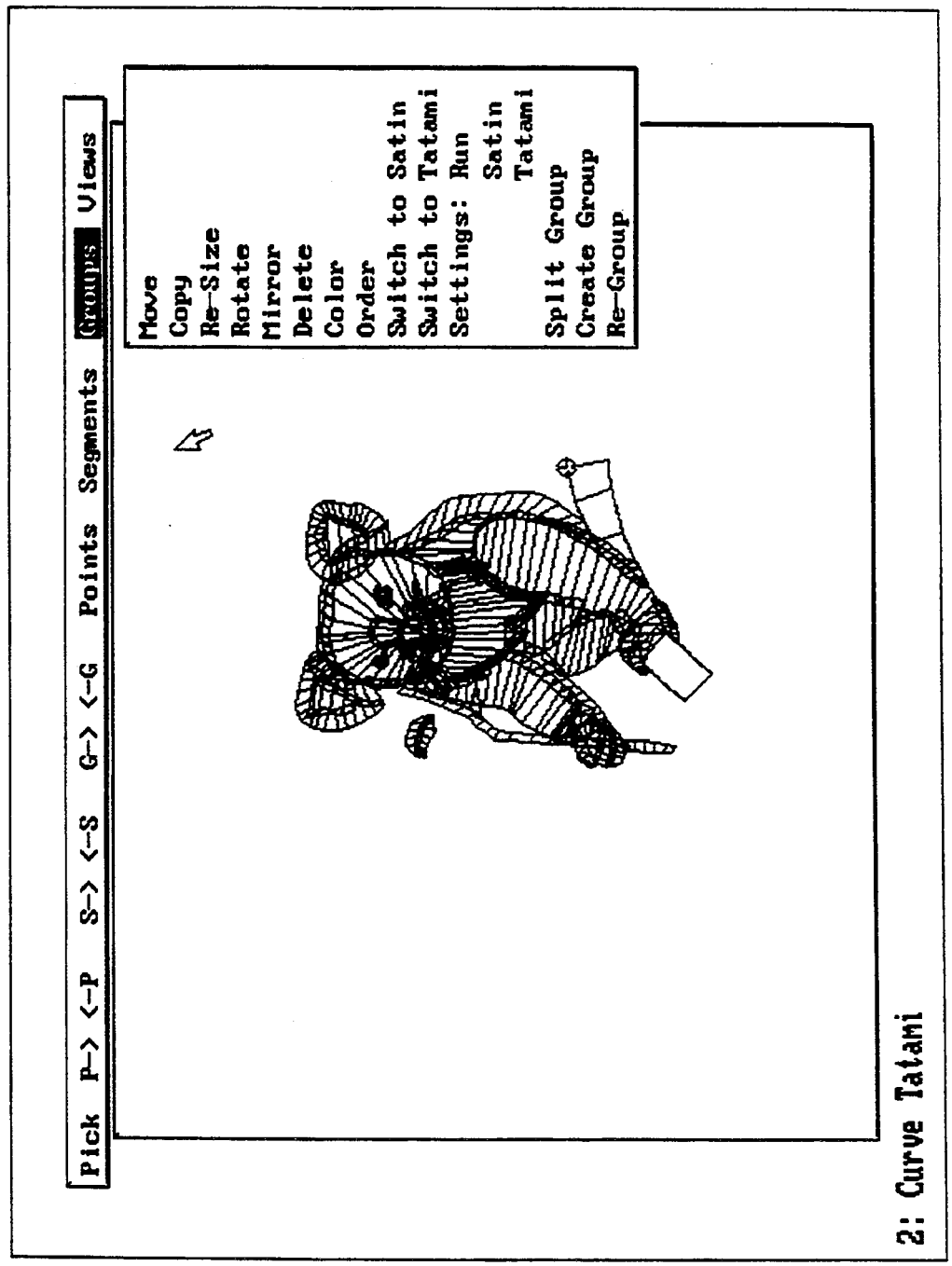
FIG. 19 shows the Groups Editing Menu of the embroidery design system of the present invention.

Group Editing, as shown in FIG. 19, allows the user to modify groups of segments entered when drawing (punching) a design. "Groups" are a number of Segments grouped together. When punching a design, the first Group is Group 1. The group that a segment is assigned to will change when:

The user changes the current group number in the Settings screen; or

There is a long stitch/jump between segments; or

The color is changed; or

The user chooses to use Text.

The modifications include Moving, Deleting, Coloring, Rotate, Copy, Re-sequencing, Changing the Settings, and Switching Satins and Tatamis, etc.

In order to edit a Group the user must first select which group to edit, the Active Group. The Group number for that segment is indicated on the Status Line. The user may use the Pick, G→, and ←G functions to move between the groups.

(a) Groups-Move: After selecting this function, the user is prompted to pick a new location for the Active Group. A box is drawn around the Active Group, and a cross-hair is placed in the center. The user is given a cursor which is a box the same size as the group, with the same cross-hair. A predetermined button moves the group to the new location.

(b) Groups-Copy: This function operates to repeatedly copy a group, until the function is stopped. After selecting this function, the user is asked to pick a new location for the copied group. A box is drawn around the Active Group, and a cross-hair is placed in the center. The box is dropped, repeatedly if desired, at the user's command.

(c) Groups-Re--Size: This function allows the user to enlarge or shrink all of the segments in the Active Group. A box is drawn around the Active Group, and a cross-hair is placed in the center. As the user moves the cursor up and down, a box is rubber-banded to indicate the new size of the group. The status line indicates the percentage change. A button is pressed to effectuate the size change.

(d) Groups-Rotate: This function allows the user to rotate either a single group or the entire design. A menu is presented to the user asking whether to rotate just this group, or the entire design. The user is then asked to provide a pivot point, a point about which the item will be rotated. Next, an angle is entered. Finally, the group or design is rotated.

(e) Groups-Mirror: This function allows the user to add to the design a mirror image of the Active Group. First the user must indicate to the system where the mirror is to be, and the angle of it. This is done by first selecting a pivot point about which the mirror will be rotated. Then an angle for the mirror is inputted. Once this information is entered, the user is prompted to mirror forward, reverse or cancel the operation.

Mirroring Forward is the most common way to mirror. This means that the new segments to be added are in the same order as they were originally punched. Mirroring Backward indicates that the new segments and points are added in the reverse order to how they were originally punched; last points and segment first etc. For example, if the user is mirroring half of a heart that was punched with only one segment, then mirroring backward will complete the heart by continuing where the first half ended.

(f) Groups-Delete: This function simply deletes all the points and segments in the Active Group. The Active Group becomes the next segment.

(g) Groups-Color: This function changes the color of the Active Group. The user is given a list of needle numbers and prompted to select the desired needle number.

(h) Groups-Order: When this option is selected, the user is prompted to choose a segment that the highlighted group is to precede. If the user confirms that the selected segment is correct, all the segments in the group are re-ordered in front of the selected segment.

(i) Groups-Switch to Satin: This option will change all the Tatami (and Curve Tatami) segments in the group to Satin (or Curve Satin).

(j) Groups-Switch to Tatami: This option will change all the Satin (and Curve Satin), segments in the group to Tatami (or Curve Tatami), but, first the user is preferably asked for Settings (so the user can provide a pattern).

(k) Groups-Settings -- Run, Satin, Tatami: The user is able to change the settings and stitch types of the segments within a group. "Run", "Satin" and "Tatami" give the user a Settings databox for those stitch types. The settings the user enters into the databox will be applied to all of the run (and two-ply and bean), satin (and curve satin) and tatami (and curve tatami) segments respectively within that group.

(l) Groups-Split Group: Split Group will divide a group in two groups. A point is first picked in the segment that the user want to be the first in the new group. Selecting Split Group will divide the group at that segment.

(m) Groups-Create Group: This function takes a number of segments and puts them into a new group. First the user is given a databox allowing the user to enter the desired Group Number for the segments that the user will grab. The system prompts the user in this databox with the next available empty group number. However, if the user want to combine these segments into an existing group, then the existing group number is entered. Next, the user is able to draw a box around the segments that the user wants included in the Group.

(n) Groups-Re--Group: This option will allow the user to change the group number of the Active Group. This way groups may be combined.

Figure 10:
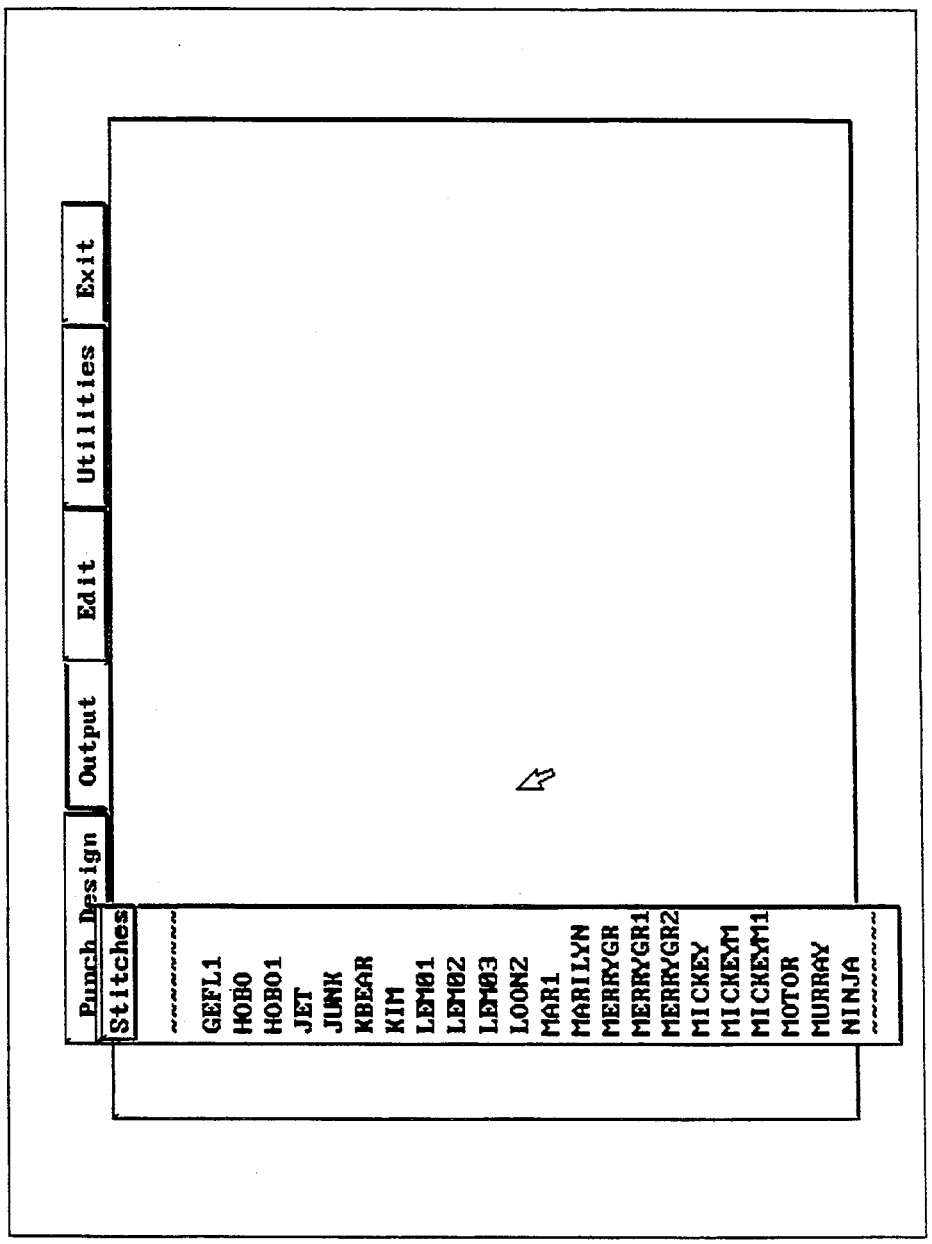
FIG. 10 shows a sample listing of stitch files on the embroidery design system of the present invention.

The Stitch Edit functions allow the user to move, delete and insert stitches and measure distances in stitch files. These modifications are preferably not made to the Outline files. When Stitch Edit is chosen, the user is preferably given a list of Stitch files to choose from, as shown in FIG. 10. When one is selected, the stitches of the design will be displayed and the user will preferably see the Stitch Edit Menu.

In order to edit a Stitch the user must first select the stitch to edit, namely the Active Stitch. The system preferably marks the Active Stitch with a symbol. When the user begins Stitch editing, the system preferably marks the very first Stitch. In many cases, of course, this is not the stitch the user want to edit. So the user will have to use the Pick, P→, and ←P functions. The Status Line preferably indicates which stitch number is being edited and any special functions associated with it, such as jump, color change, etc. If desired, the actual x-y movement of the stitch is also displayed, preferably in embroidery machine pulses 0.1 mm).

Stitches may be grouped together and edited as groups. Stitch Groups are a series of stitches which have been grouped together in order to simplify some editing functions. When entering Stitch Edit, the design is automatically Grouped by color or whenever there is a long jump, for example. The Groups can be changed using functions set out below.

When editing is finished, the user may save the stitch file under the same, or a different name, if desired.

(a) Pick: This function is similar to the Pick function as previously described.

(b) P→ and ←P: If the wrong stitch was selected, the user can use the 'P→' and '←P' functions, mapped to predetermined keys, to move to the next and previous stitches respectively, as previously described.

(c) G→ and ←G: These functions move the user from Stitch Group to Stitch Group, as previously described for outline groups.

Figure 20:
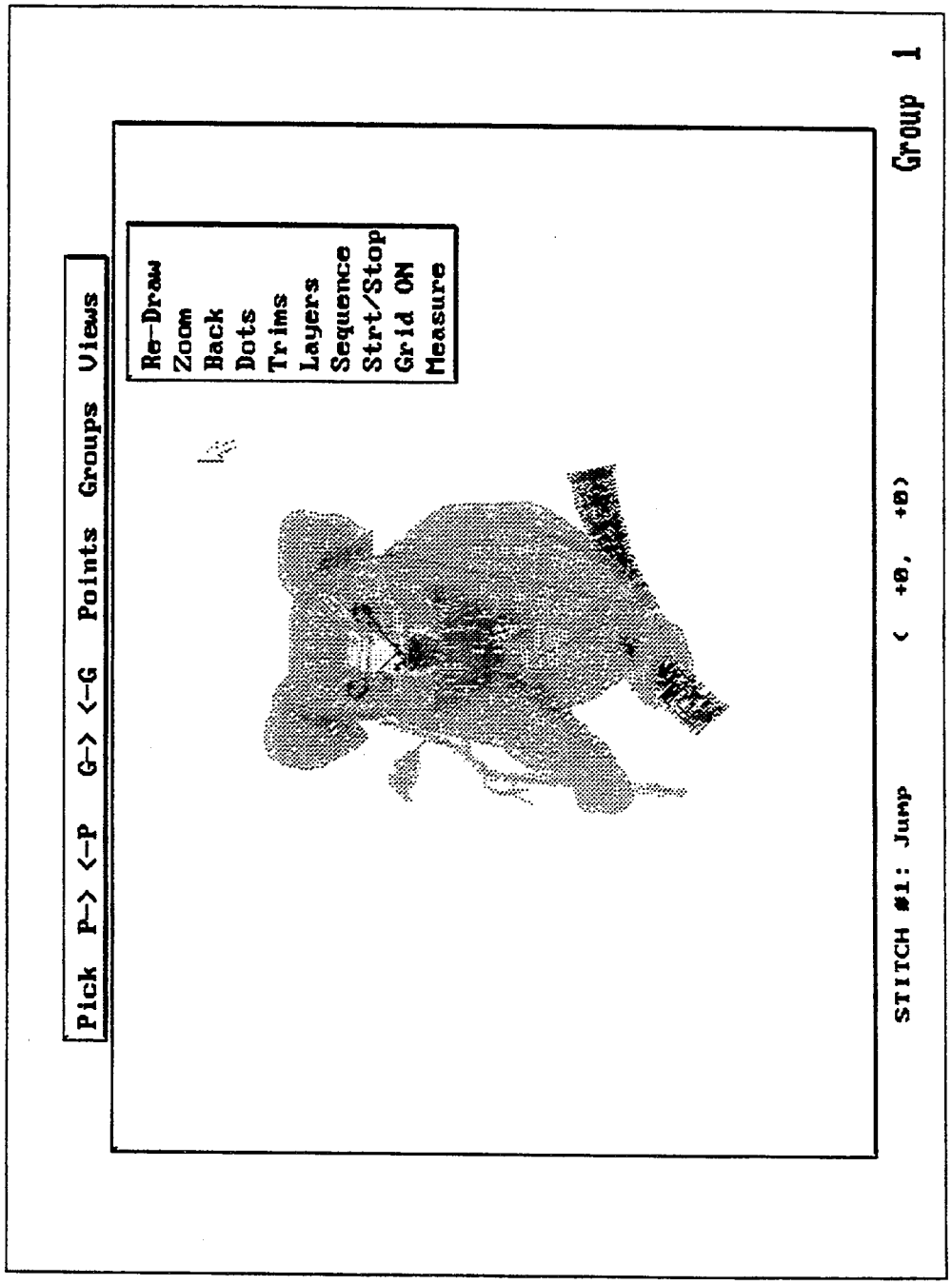
FIG. 20 shows the Stitch Edit-Views Menu of the embroidery design system of the present invention.

The Stitch Edit-Views menu is shown in FIG. 20.

(d) Views-Re-Draw: This function re-draws the design. If the view was zoomed in, it preferably remains zoomed in.

(e) Views-Zoom: The Zoom function allows the user to zoom in on an area to look at the detail, as previously described.

Figure 21:
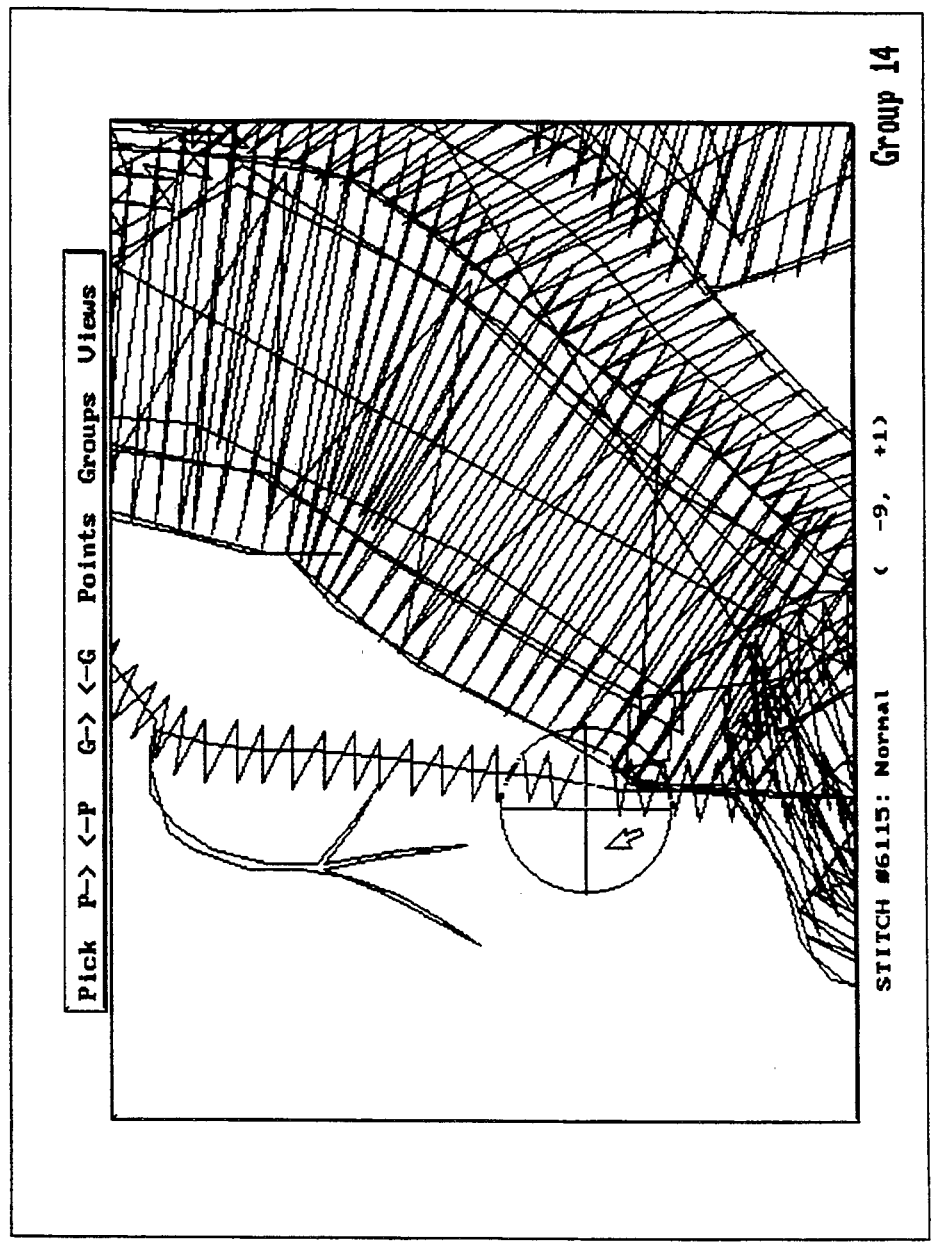
FIG. 21 shows a zoomed design, with the Active Stitch marked.

FIG. 21 shows a zoomed design, with the Active Stitch marked.

(f) Views-Back: This function 'unzooms' the design.

(g) Views-Dots: This function highlights the location of the stitches by placing a symbol where the fabric is penetrated.

(h) Views-Trims: A symbol is drawn everywhere a trim occurs.

(i) Views-Layers: This function allows the user to turn off any one or more of the needle numbers.

(j) Views-Sequence: This functions allows the user step through the design color by color. The user preferably presses predetermined keys to move forward or backward through the design.

(k) Views-Start/Stop: Markers are preferably placed at the beginning of the design, and at the end of the design.

(l) Views-Grid ON or OFF: A user-definable Grid may be overlayed on the design. When chosen, the user is given a databox to select the dimensions of the Grid boxes (separately for horizontal and vertical lines). After selecting the dimensions, the Grid is placed on the screen. If the Grid is currently on, then the menu item preferably says "Grid OFF" and vice versa. Picking it turns the Grid OFF.

Figure 22:
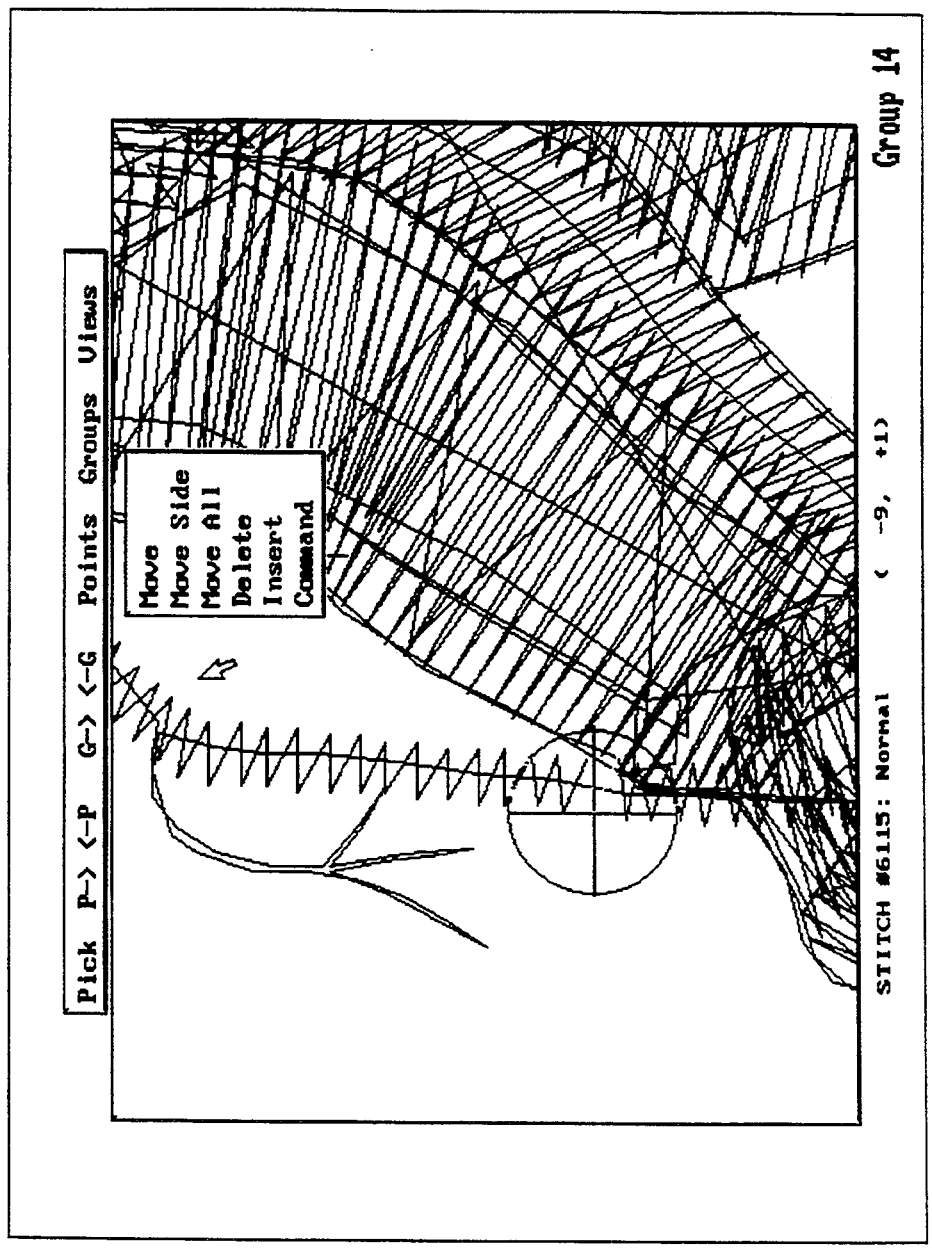
FIG. 22 shows the Stitch Edit-Points Menu of the embroidery design system of the present invention.

(m) Views-Measure: Measure allows the user to measure distances in "real" terms, even in the zoomed mode. The user is preferably given a cross-hair to pick a point, after which as the user moves the mouse or cursor, a ruler is "rubber-banded" and the distance is displayed in the Status Line at the bottom of the screen. Also displayed is the horizontal ("x") movement, and the vertical ("y") movement. If the user picks a second point, the line is fixed in position and the user is able to pick a first point again. This continues until the process is ended by pushing a predetermined button. The Stitch Edit-Points menu is shown in FIG. 22.

(n) Points-Move: After selecting this function, the user is asked to pick a new location for the Active Stitch, as previously described.

(o) Points-Move Side: As previously described.

(p) Points-Move All: As previously described.

(q) Points-Delete: As previously described.

(r) Points-Insert: This function inserts a point after the Active Stitch. The user is preferably asked to pick a location for the new stitch. Once chosen, the new stitch is inserted. The new stitch becomes the Active Point. The user is immediately able to insert another stitch, effectively allowing the user to punch stitch-by-stitch. If the inserted stitch is quite long, jump stitches are preferably inserted automatically.

(s) Points-Command: The Command function allows the user to change the attribute of a stitch. That is, the user can select whether the stitch should be normal, a jump, stop, color change, etc. Choosing this function gives the user a menu of all available machine commands. If the user choose Color Change from this menu, the user is then given a list of needle numbers.

Figure 23:
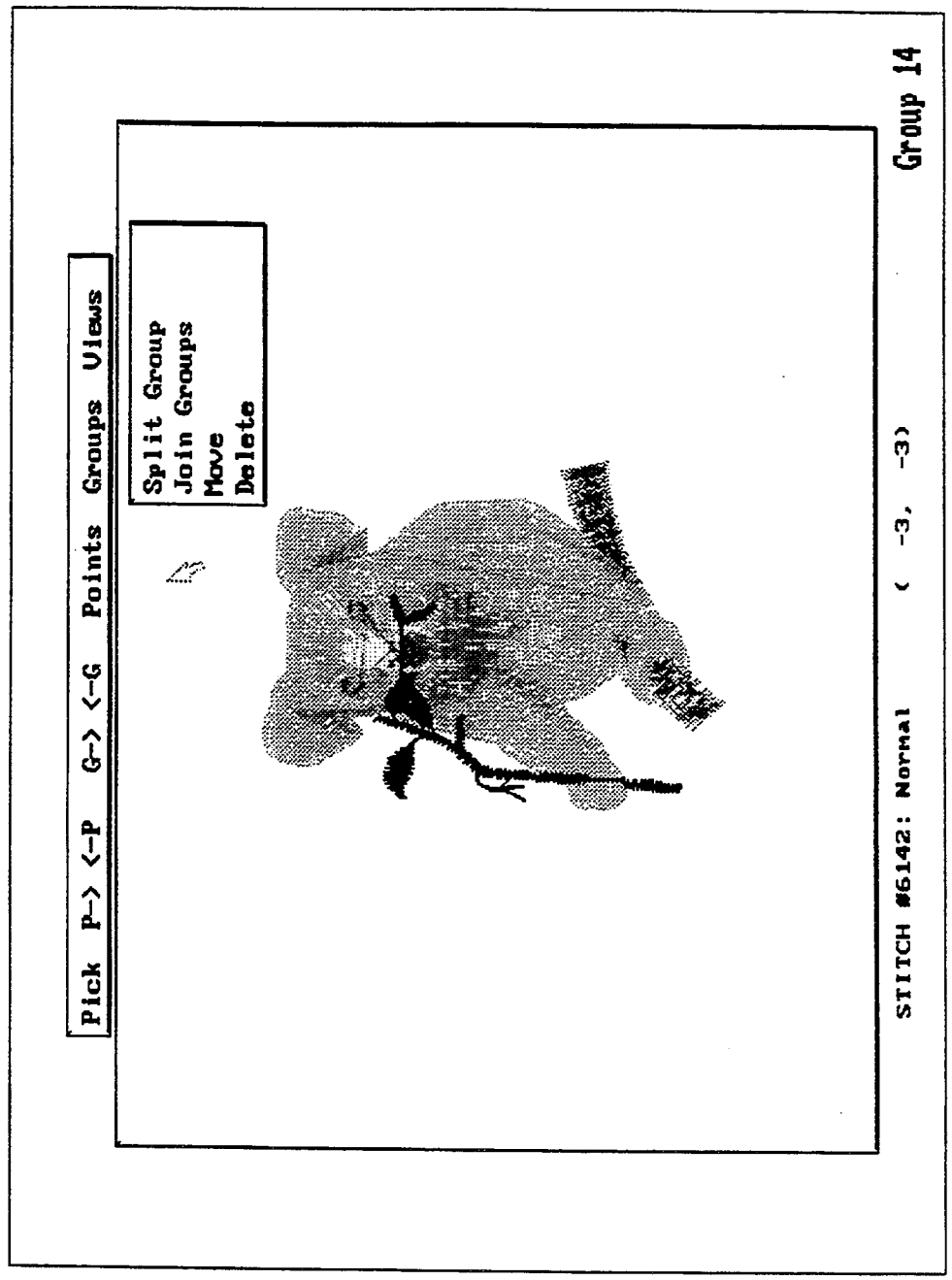
FIG. 23 shows the Stitch Edit-Groups Menu of the embroidery design system of the present invention.

The Stitch Edit-Groups menu is shown in FIG. 23.

(t) Groups-Split Groups: When entering Stitch Edit, the design is automatically Grouped by color. Each time there is a color change command or a long jump, the group number is incremented. More Stitch Groups can be created by Splitting an existing group by picking a stitch where the user wants the new group to start and selecting this option.

(u) Groups-Join Groups: If the user wishes to join several groups together, selecting Groups-Join Groups puts together the Active group as well as the next group.

(v) Groups-Move: Groups--Move puts a box around the current group and gives the user a box with a cross-hair in order to place the Group of stitches in a new location. Jumps stitches, if appropriate, are inserted before and after the group in order to accommodate the move.

(w) Groups-Delete: Groups--Delete deletes the stitches in the current Group. Jumps stitches, if appropriate, are inserted.

Figure 24:
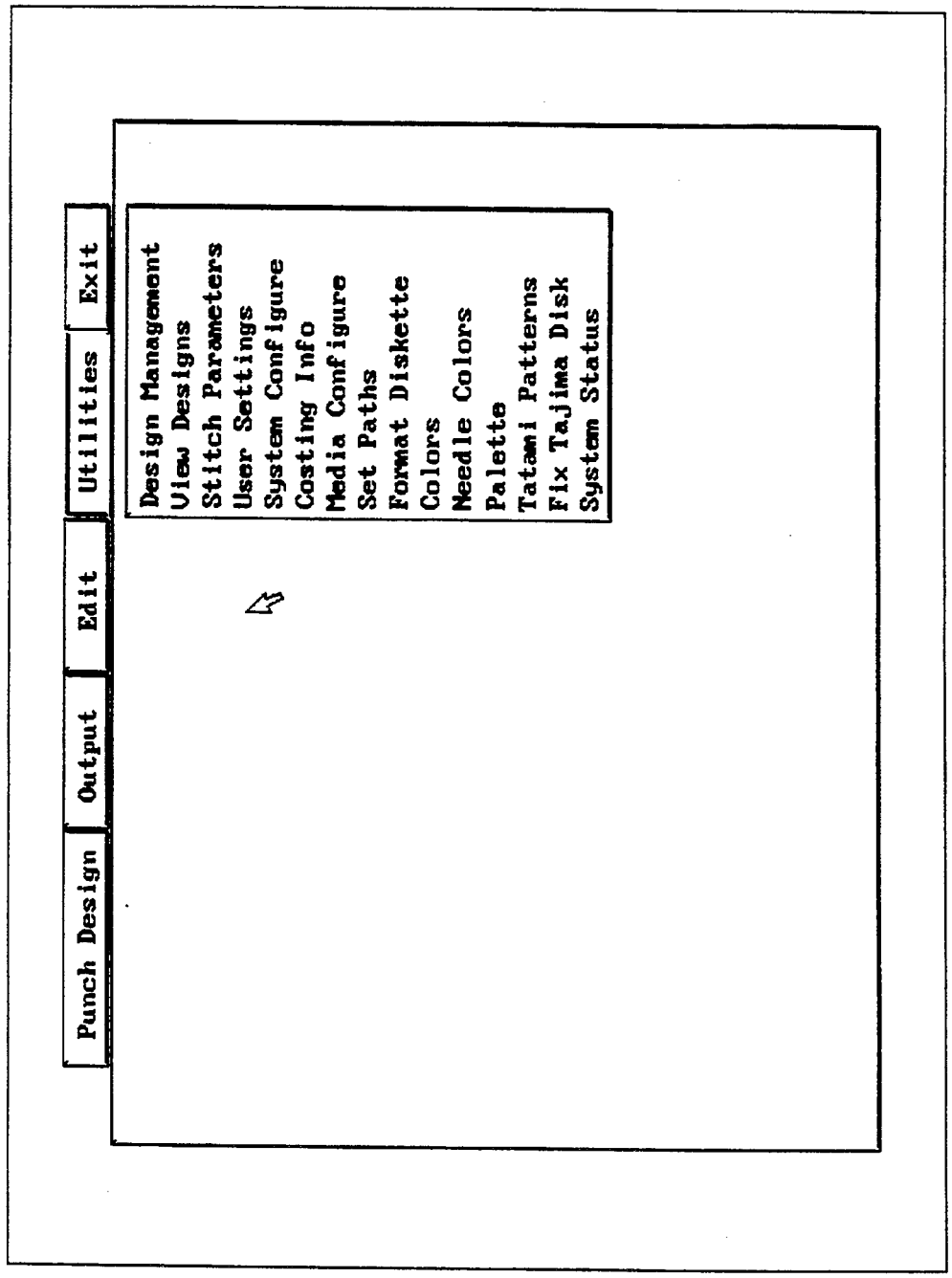
FIG. 24 shows the Utilities Menu of the embroidery design system of the present invention.

The present system provides a Utilities menu for allowing the user to customize the system. Choosing Utilities from the Main Menu gives the user the Utilities Menu shown in FIG. 24.

(a) Design Management: This is a Utility function, to be used for managing design files on the system disks, providing conventionally known functions, such as Copy, Rename, Delete, Backup, Restore, and Make Directory.

(b) View Designs: This function is used to quickly review stitch files. The user is given a list of Stitch Files to choose from. The selected design and design information is displayed. After one design has been displayed, the user is given a menu of Stitch Files again, to view others.

Figure 25:
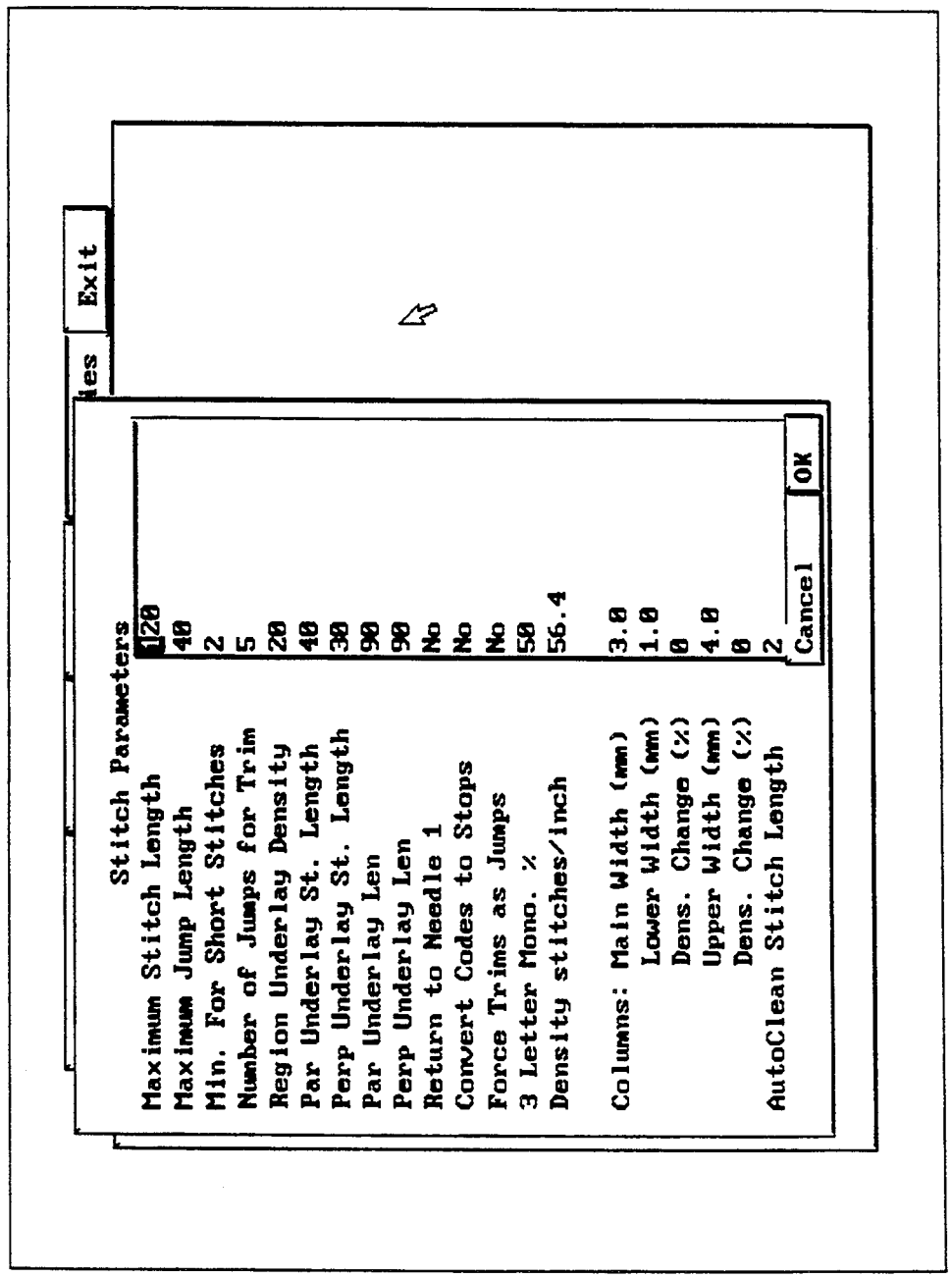
FIG. 25 shows the Stitch Parameters Menu of the embroidery design system of the present invention.

(c) Stitch Parameters: This function allows the user to set a number of items which affect the stitching of designs. The user is presented with the data box shown in FIG. 25.

(1) Maximum Number of Colors: This will limit the system to the use of the number of colors supported by the embroidery machine.

(2) Maximum Stitch Length: Any number greater than this length will be broken into smaller increments using jump commands. The size of the increment that the stitch is broken into is set by the Maximum Jump Length.

(3) Maximum Jump Length: No jumps are allowed to be greater than this value.

(4) Minimum for Short Stitches: This is the minimum length before which short or 'half' stitches will be performed.

(5) Number of Jumps for Trim: If the 'Trim Jumps' command is used when punching the design, this is the number of jump commands issued in order to activate the automatic trimmer on the embroidery machine.

(6) Region Underlay Density: This is the density of parallel underlays if automatic underlays have been used.

(7) Parallel Underlay Stitch Length: This is the stitch length for stitches which are part of a parallel underlay.

(8) Perpendicular Underlay Stitch Length: This is the stitch length for stitches which are part of a perpendicular underlay.

(9) Parallel Underlay Length Percentage: This is the percentage that parallel underlays are kept from the outline of the overlay stitches.

(10) Perpendicular Underlay Length Percentage: This is the percentage that perpendicular underlays are kept from the outline of the overlay stitches.

(11) Return to Needle 1: If "yes", then the system will automatically return to Needle 1 at the end of the design. Otherwise no extra color change command will be inserted.

(12) Convert Codes to Stops: This causes the system to replace all special codes in a design (color changes, etc.) with Stop commands.

(13) Force Trims as Jumps: This will force all trim commands to be performed as a series of jumps. For example, if the user is outputting Barudan code, then jumps will be used instead of trim commands. More importantly, if the user is outputting to Melco disks, then jumps will be used, instead of ignoring the trim command. This is useful when outputting to a Melco disk meant for an MKU connected to a Tajima machine with trimmers.

(14) Three Letter Monogram Percentage: This function controls the difference in height between the center letter of a 3-letter monogram, and the letters to the left and right of center. For instance, if the height is 1 inch and the percentage is on 50%, the letters on either side of the center will be one-half inch.

(15) Density Stitches/Inch: This is the number of stitches in a one inch satin column. A default value is preferably provided. If the user prefers heavier coverage, this number is increased.

(16) Columns: Main Width, Lower Width, Density Change, Upper Width, Density Change: These 5 parameters perform automatic density change in satins and fills. The Main Width is a Column Width that is the average. At this width, the identity will be the density that the user sets for the design. At the Lower Width, the density will be "opened up" by the percentage that the user set for Density Change. At the Upper Width, the density will be "tightened" by the percentage that the user set for the Density Change for wide areas.

For example, if the user set a Main Width of 10 mm, a Lower Width of 3 mm, with 50% density change, and an Upper Width of 20 mm with 50% density change, then if the user has set a design density of 56.4 stitches per inch: A narrow column of, for example, 2 mm will have a density of 28.2 spi, and a wide fill of 30 mm will have a density of 84.6 spi.

(17) AutoClean Stitch Length: This function will "clean up" or delete any unnecessary short stitches. Any-stitches shorter than this number will be eliminated. A value of 0 means no stitches will be cleaned. A value of 2, for example, means that stitches of 0 length and length of 1 will be eliminated during Output.

Figure 26:
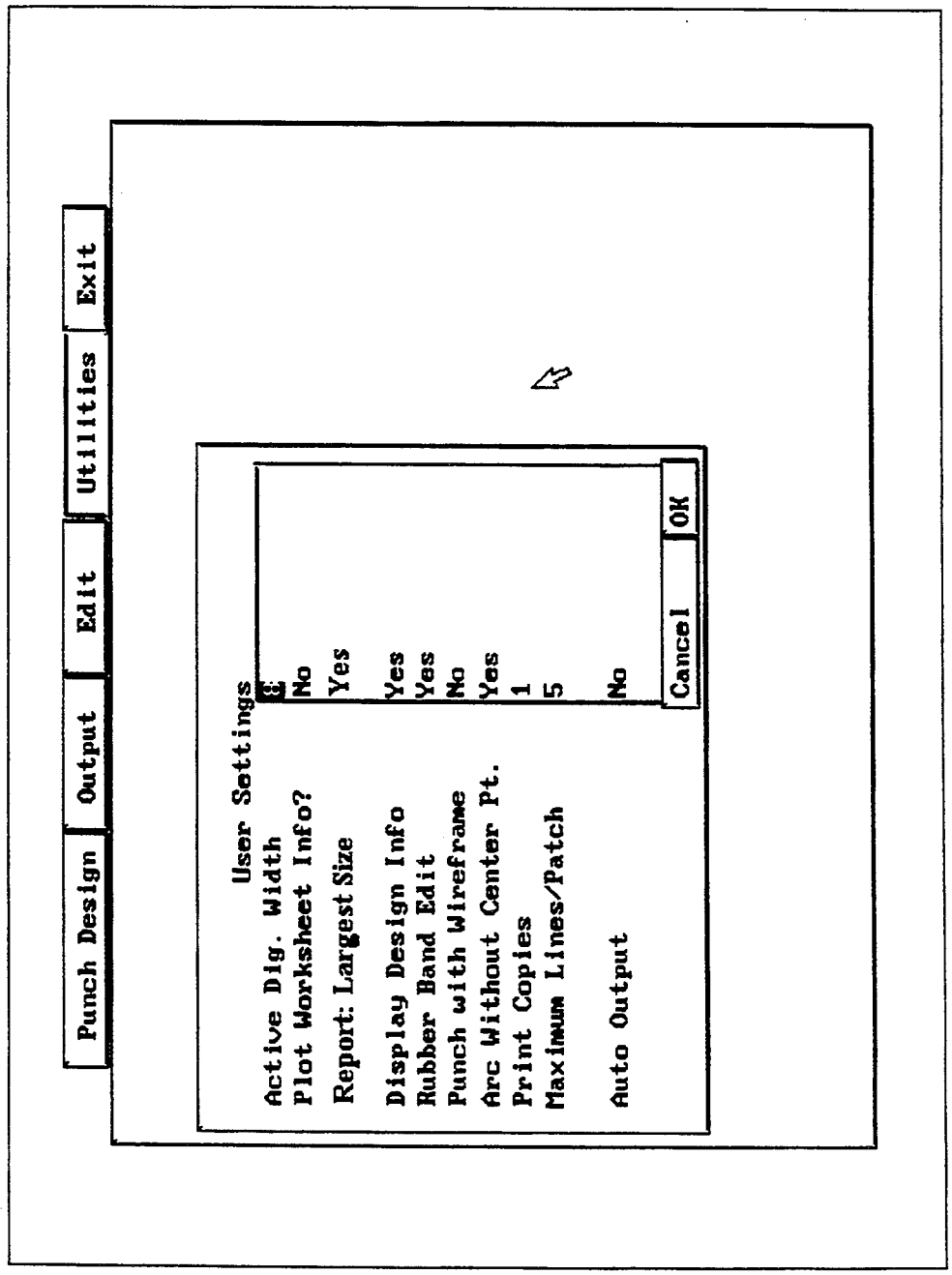
FIG. 26 shows the User Settings Menu of the embroidery design system of the present invention.

FIG. 26 shows the User Settings Menu:

(d) User Settings:

(1) Active Digitizer Width: When the user is picking from menus, this is the size of the area that is mapped onto the screen.

(2) Plot Worksheet Info: This parameter determines, when plotting the design, if is plotted.

(3) Display Design Information: Determines if the Design Information is displayed every time the user views a design.

(4) Rubber Band Edit: The Rubber Band Edit function allows the user to see the changes while moving points in Outline Edit.

(5) Punch with Wireframe: Punching with "Wireframe" on allows the user to view only the digitized outline points, not the stitches. Punching in this fashion makes the design easier to view.

(6) Arc Without Center Point: This function allows the user to enter an arc by placing two points on the screen with a rubber-banding line in between which controls the radius of the arc. This function is used by placing first and second points on the screen, these being the leftmost and rightmost placement points for the lettering. Once these points have been entered, a rubber-banding line will appear. By moving this line, the user has the ability to control the shape of the arc.

(7) Print Copies: This setting will cause more than one copy of a print-out to be produced quickly on certain printers.

(8) Maximum Lines/Patch: This function controls the number of lines that the user may enter for the Move and Copy function for each patch and the Multiline function.

(9) Auto Output: When this is set to Yes, the system will automatically go to output the user design each time the user is Done.

Figure 27:
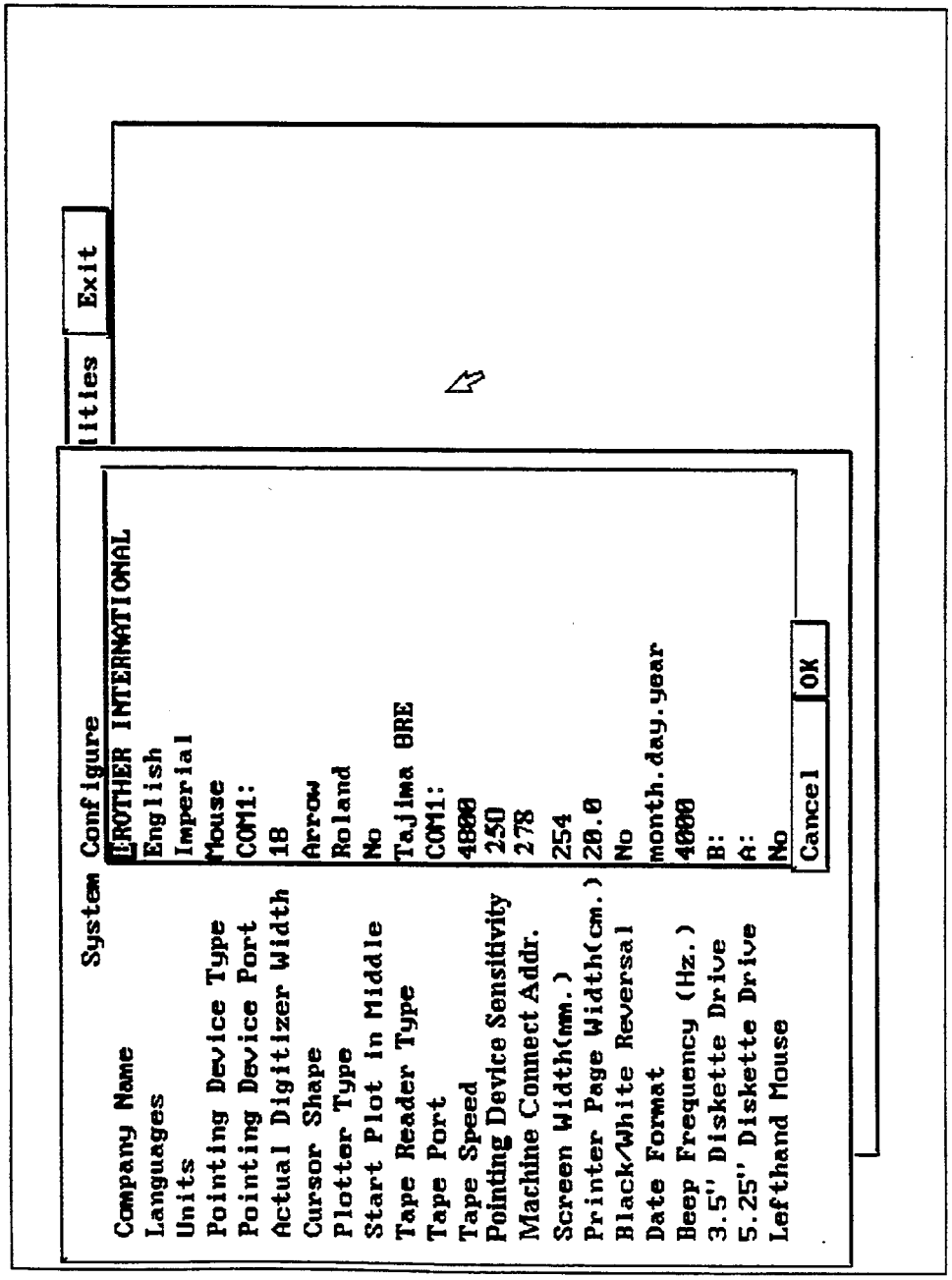
FIG. 27 shows the System Configuration Menu of the embroidery design system of the present invention.

(e) System Configuration: This function is used to set a number of Parameters affecting the use of the system itself. The parameters are presented in a data box, as shown in FIG. 27:

Company Name-: This is the name that is printed on Worksheets and in the leader of paper tapes.

Languages: Allows the user to change the system over to any of several languages.

Units: The user may choose Imperial or Metric.

Pointing Device Type: This is the type of digitizer in use.

Pointing Device Sensitivity: Sets the sensitivity for digitizer or mouse.

Actual Digitizer Width: This is the actual physical size of the active area of the digitizer.

Cursor Shape: This is the shape of the cursor at all times except when zooming, when preferably a crosshair and box are used, and punching, when a crosshair is preferably used. The choices are preferably an arrow, a pointing hand and a crosshair.

Plotter Type: To set whether the user has a plotter which uses HP commands or Roland commands, for example.

Start Plot in Middle: On a plotter, this selection will start the plot in the middle of the page. Otherwise, the user may position it as desired.

Tape Port: Identifies the paper tape punch output port.

Tape Speed: Identifies the Baud rate of the tape punch.

Screen Width: This is the actual width of the screen.

Printer Page Width: If the user has a printer attached, this is the width of the page.

Black/White Reversal: When printing, the printout may be easier to read if the black items are printed as white, and the white items are printed as black. Choosing Yes performs this reversal.

(f) Costing Info: This menu, allows the user to enter information to assist the system in calculating design cost information.

Speed: This value is the average speed at which the embroidery machine will be sewing.

Cost/minute: This value represents the cost per minute to operate the embroidery machine.

(g) Media Configure: This function allows the user to turn on or off some of the tape and disk codes from the Input and Output Media menus to make them less confusing.

Disks, Tapes, Other: Turn off media that are rarely used, to simplify the user Input and Output Media screens.

Leader Elements: This allows the user to select the items that will be punched on the leader of a paper tape: System Name, Company name, Design ID, Design Name, Code Type, Date, Stitch Count, Size.

Melco File Attributes: This allows the user to set the file attributes for files written to Melco diskettes: write-protected, copy-protected, and/or kill-protected.

(h) Set Paths:

Files: All data files will be stored and retrieved from this drivepath.

Monogram Files: The monogram font files will be retrieved from this drivepath.

Stitch Files—Input: Determines the path for input of Stitch Files.

Stitch Files—Output: For use with the Embroidery Passport System.

(i) Colors and Needle Colors: The user is presented with a menu of various items the colors for which can be set. These include such items as, menu colors, highlight colors, etc.

Figure 28:
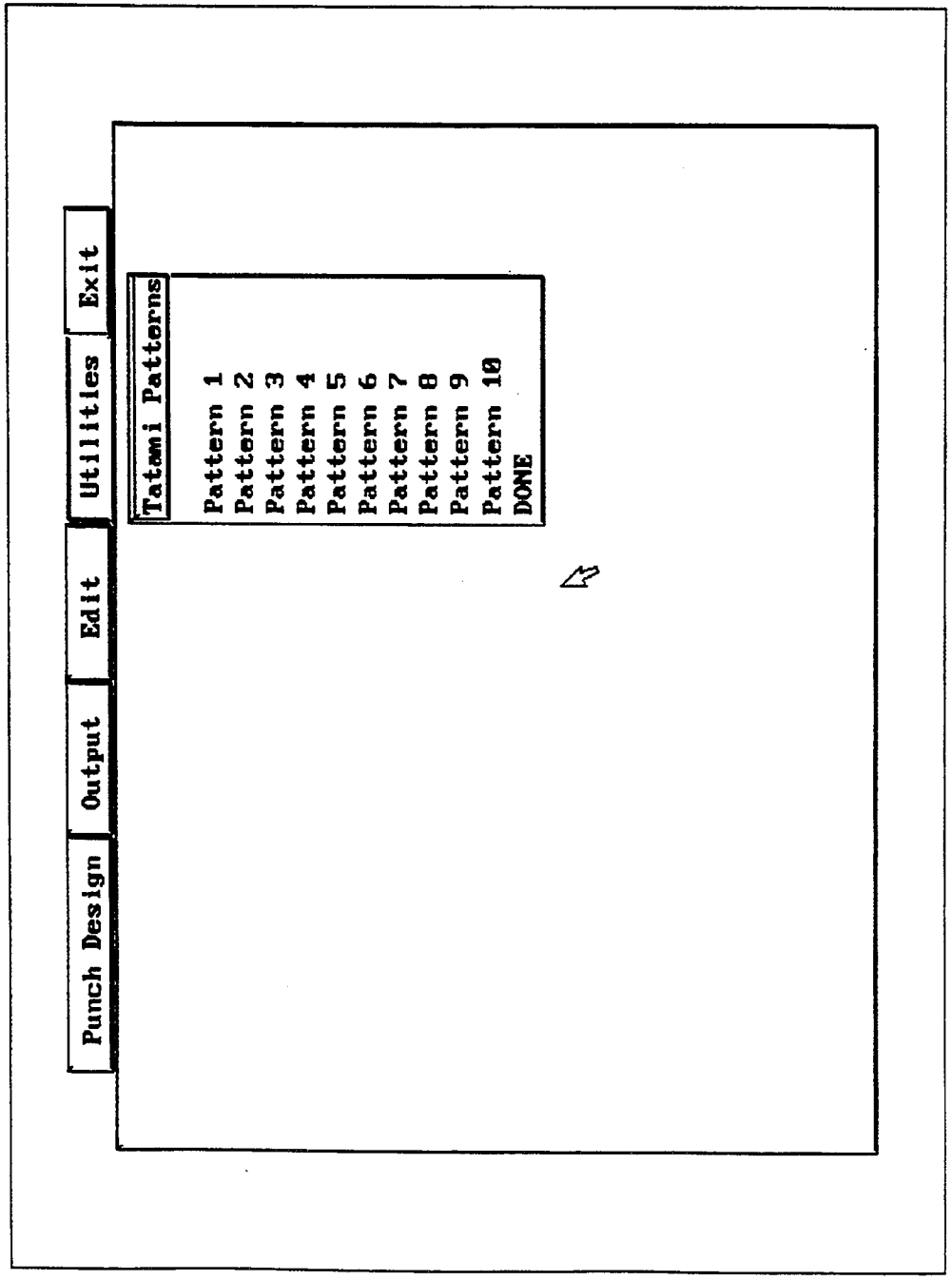
FIG. 28 shows the Tatami Patterns screen of the embroidery design system of the present invention.

(j) Tatami Patterns: The system provides a group of tatami patterns to choose from, as shown in FIG. 28. The user preferably has the option to program some of these, if desired. This is done by preferably providing the required offsets and stitch lengths for each pattern to be defined.

(k) Fix Tajima Disk: This utility is for using Tajima disks which have been created on a Melco Epicor/EDS.

As indicated previously, the system of the present invention may be used for converting an embroidery representation from a conventional format into a bridge-style format. The present method may generally be applied to any expression, provided the characters are in an outline data format, such as in the embroidery manipulation system as disclosed above. The expression may include, for example, letters, numbers, or figures in many fonts and stitch patterns, provided that the data is represented in an outline format. As previously described, in an outline format, the characters are described by a combination of x-y stitch-points, and control data for determining stitch directions, colors, or other pertinent control information.

Figure 29:
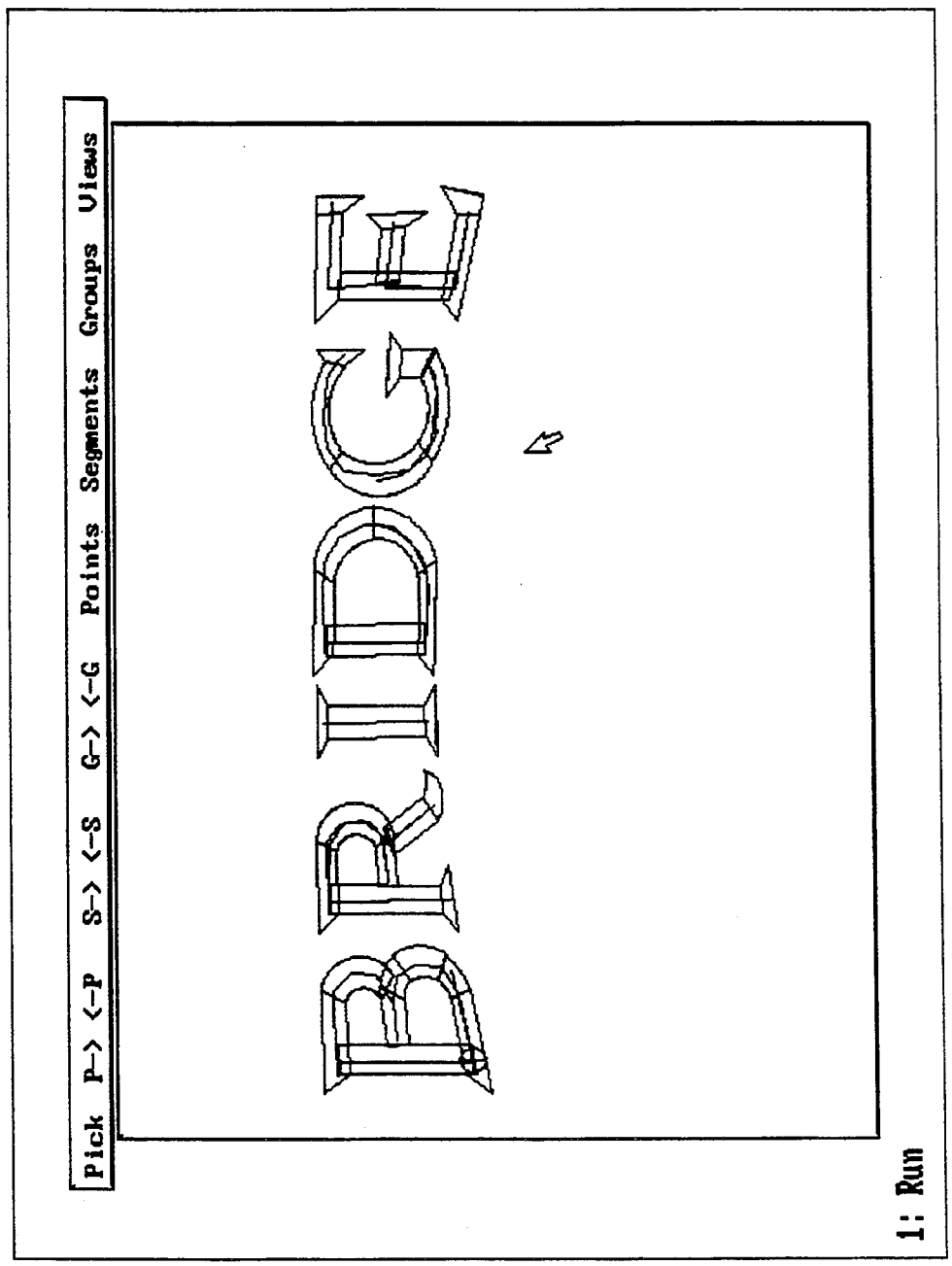
FIG. 29 shows an example of Flat Top Bridge Lettering.
Figure 30:
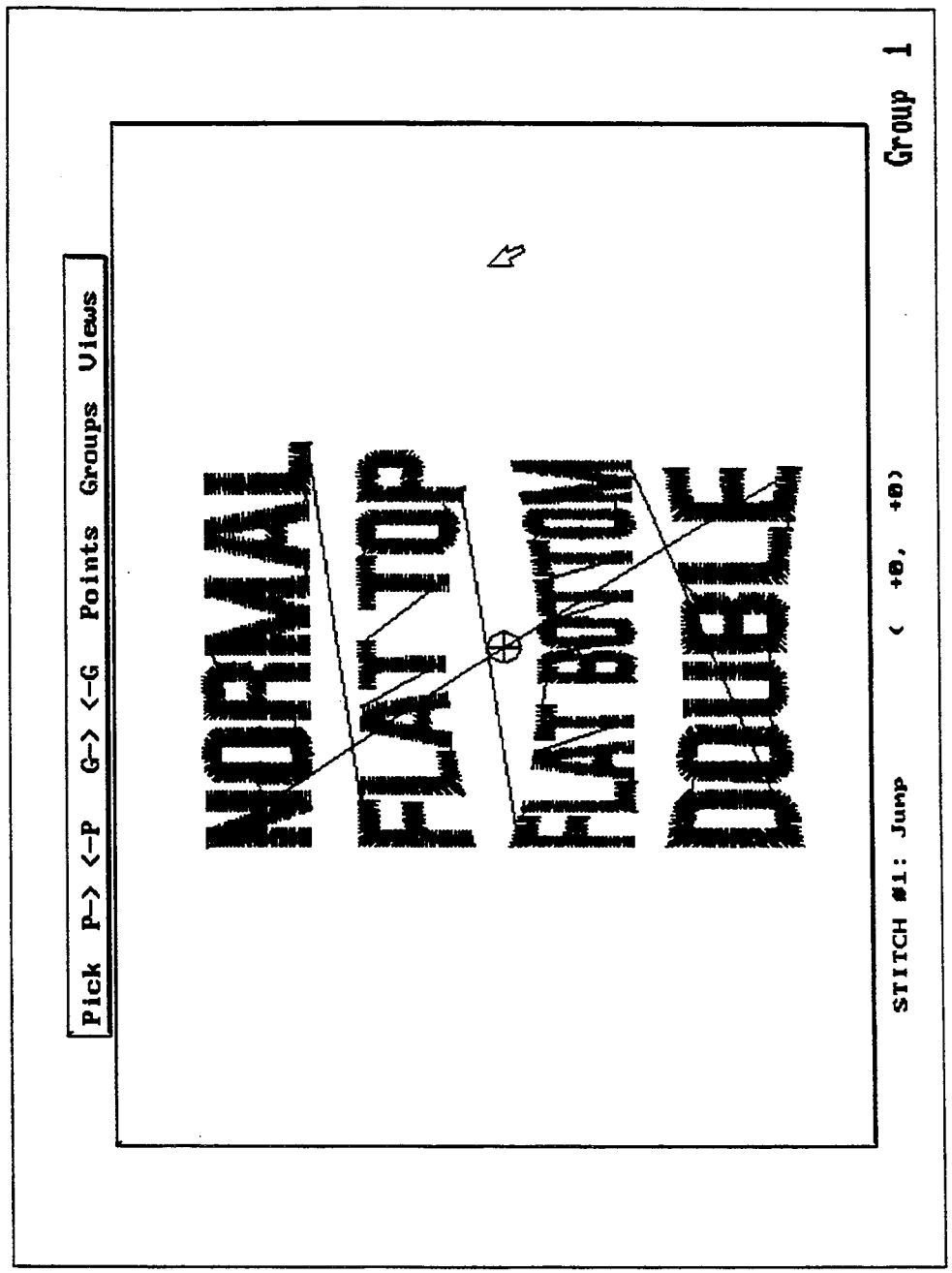
FIG. 30 shows an example of Flat Top, Flat Bottom, and Double Bridge Lettering.

FIGS. 29–30 are examples of bridge type lettering. FIG. 29 shows Flat Top bridge lettering. As can be seen, in this type of lettering the letters are reconfigured with an upward arc at the bottom of the letters.

FIG. 30 shows Flat Bottom type lettering. These letters are flat at the bottom, and include a downward arc at the top.

FIG. 30 also shows Double Bridged type lettering. Letters of this type have a downward arc at the top, and an upward arc at the bottom.

In order to transform the letters from conventional type to bridge type, the user must specify the dimensional parameters of the shape of the bridge. One method for entering the data is by requiring the user to define a Bridge Rise Percentage. The Bridge Rise Percentage is the percentage of the letter height that the lettering will rise above the baseline at the center point of the lettering. This specifies the highest that the lettering will arch. For Flat Top or Double lettering, it will be necessary for the user to specify the Bridge Fall Percentage of the arch for the top of the lettering.

The user must also specify other information for the system of the present invention to properly transform the lettering. The user must input a baseline on which the lettering will sit.

In an alternative embodiment, rather than specify the rise, the user would place first and last points of the baseline on which the letters will sit. Then the system would allow the user, to position a middle point of the arc anywhere between the two baseline endpoints. The system "rubber-bands" an arc around the middle point, between the two endpoints.

In a third embodiment, a user might in put four points to define the bridge. A first point might be entered defining the center of a circle. As the mouse is moved, a circle is rubber-banded until the first point on the arc is placed. Two additional points are then placed; the third point defining the direction of sewing; and the fourth point defining the last point on the arc.

While the aforementioned methods for placing defining the location and arc of the lettering, it is readily foreseen that other methods exist for placing the lettering and defining the arc. Regardless of which technique is used, the user must have inputted the definition of an arc, an the first and last points on the arc which define the placement points for the beginning and end points of the lettering.

For the circle, a radius and center points are calculated. Thus, the system requires four primary pieces of information to transform the letters: 1) A circle center point; 2) a circle radius; 3) a starting point on the circle for the lettering; and 4) an ending point on the circle for the lettering.

Once this information has been entered, the selected letters are preferably scaled to fill a box defined as:

(a) The width of the box is the desired width of the entire text. This line is generally the baseline.

(b) The height of the box is the desired letter height at the left and right sides of the entire text. The user indicates this by either typing the letter height, or drawing another line that defines the letter height on the screen.

In order to place the letters in the desired box, it is first necessary to scale them. The scaling is preferably performed by adding up the internally stored widths of each letter in the text, including a factor for inter-letter spacing, and dividing this by the desired width. This ratio is then used to scale each letter.

Likewise, the height scale is determined by taking the internally stored height of the font, and dividing by the desired letter height.

Each scaled letter is placed internally in the box, along the baseline. Since each letter may be represented as its own smaller box, each of these boxes is placed on the baseline.

In order for each letter to be converted to a bridge format, the letter proportions must be modified to intersect the defined circle. A percentage is calculated which is required to vary the letter height to move the lower left corner of the letter to intersect the defined circle. A similar percentage is computed for the lower right corner of each individual letter box.

The actual outlines for the letters are now brought into memory, and scaled as they are brought in. However, instead of simply the using the x any y coordinate definitions of each letter, the y coordinates are scaled to place them on the defined circle. This is accomplished by looping through each coordinate point in the outline of the letter. For each x coordinate point, the y scale is adjusted to be larger or smaller than the overall y scale. The new y scale at any given point depends on the x coordinate for that point, and the percentages as described above and defined hereinafter. Points at the far left of the letter's box will use the lower left corner's percentage; at the far right, they use the lower right percentage. In between the end points, they use a percentage of the two, based on the x coordinate.

The values are computed according to the following equations:

ybaseline in the y coordinate of the bottom of the unscaled box.

yhalfway is the halfway point between the top and bottom of the box.

Each point is looped through, and scaling percentages are computed using the following equations:

$$xpcnt = \frac{(x - leftx)}{(rightx - leftx)}$$

-continued $$ypcnt = 1 - (leftbrdg + xpcnt*(rightbrdg - leftbrdg))$$

Leftbrdg for a given letter is calculated as:

$$leftbrdg = \frac{(y - (ycentre - \sqrt{r^2 - (x - xcentre)^2}))}{height}$$

Leftbrdg is the percentage of the letter height that the letter is raised off the baseline at the leftmost portion of the letter. Similarly, rightbrdg is the percentage of the height that the letter is raised off of the baseline at the right side of the letter. If desired, rightbrdg may be estimated as the leftbrdg of the next letter, or may be calculated independently.

As indicated earlier, the points defining the arc upon which the lettering will bridged are used to compute a circle definition. xcentre and ycentre are the x and y coordinates of the center of this circle, with r being the radius of the circle.

Variables x and y are the x and y coordinates of the lower left corner of the letter before the bridging transformation.

Having computed the reducing percentages required to place the letter on the defined circle, new y coordinates are computed for each coordinate point. The new y value is computed according to the following equations:

For FLAT TOP Bridges:

$$newy = ybaseline + ypcnt*(y - ybaseline)$$

For FLAT BOTTOM Bridges:

$$newy = lefty - ypcnt*(lefty - y)$$

For DOUBLE bridges:

$$newy = yhalfway + ypcnt*(y - yhalfway)$$

In this embodiment, the side of the letter place upon the arc is not actually in the shape of an arc, but rather as a straight line stretching between the points on the arc where the left and right sides of the box containing the letter intersects the letter. This embodiment has been found to be effective at emulating an arc. If desired, the equation which computes xpcnt could be modified to incorporate the arc shape rather than scaling each letter to be located on a straight line.

Although the present invention has been described in detail with respect to certain embodiments and examples, variations and modifications exist which are within the scope of the present invention as defined in the following claims.

What is claimed is:

1. A method for converting an alphanumeric embroidery pattern to a bridge-format embroidery pattern in a data processing system, said data processing system comprising display means capable of displaying an embroidery pattern thereon, and scaling means for scaling embroidery pattern data provided thereto in accordance with a designated scaling factor for varying said displayed embroidery pattern, each embroidery pattern being in an outline data format, said alphanumeric embroidery pattern comprising at least one alphanumeric embroidery character, said at least one embroidery character comprising a plurality of x-y coordinate outline data points, said method comprising:

interactively selecting a first placement point on said display means for defining a starting point for said bridge-format embroidery pattern;

interactively selecting a second point on said display means spaced from said first point, said spacing being equal to a desired width for said bridge-format embroidery pattern;

interactively defining on said display means a height, said height corresponding to a desired height for said bridge-format embroidery pattern at said first and last placement points;

interactively communicating said desired width and height to said scaling means; scaling said alphanumeric embroidery pattern x-y coordinate points to correspond to said bridge-format embroidery pattern desired height and width; displaying said scaled alphanumeric embroidery pattern on said display means;

interactively defining on said display means an arc corresponding to a desired arc for said bridge-format embroidery pattern;

interactively providing said scaling means with said desired arc, said scaling means determining a scaling factor at each x-coordinate point of said scaled alphanumeric embroidery pattern for scaling each corresponding y-coordinate point of said scaled alphanumeric embroidery pattern for transposing said alphanumeric embroidery pattern to correspond with said desired arc, and scaling said alphanumeric embroidery pattern y-coordinate data points to correspond with said desired arc for generating said bridge-format embroidery pattern; and displaying said generated bridge-format embroidery pattern on said visual display means.

2. The method according to claim 1 wherein said alphanumeric embroidery pattern being is representable in a stitch data format, said method further comprising the step of:

converting said stitch data format to an outline data format comprising x-y coordinate outline data points and stitch data.

3. The method according to claim 2 wherein said display means is further capable of displaying an embroidery pattern in a stitch data format, said method further comprising the step of:

displaying said alphanumeric embroidery pattern on said display means prior to the step of converting said stitch data to outline data.

4. The method according to claim 1 wherein the step of defining said arc comprises interactively selecting a bridge rise percentage for said bridge-format pattern, said bridge rise percentage being a percentage of said height that said arc in said bridge-format pattern rises above or falls below said height of said bridge-format pattern, said bridge rise percentage being capable of being positive or negative;

5. The method according to claim 1 wherein said alphanumeric embroidery pattern comprises at least two alphanumeric embroidery characters and further comprises intercharacter spacing, and the step of scaling said alphanumeric embroidery pattern width further comprises scaling said intercharacter spacing so as to maintain a proportional spacing between said alphanumeric embroidery characters.

6. A method for converting an input embroidery pattern comprising at least one alpha-numeric embroidery character to a desired embroidery pattern, each of said embroidery patterns being in an outline data format comprising outline data points, said method comprising:

providing a plurality of selectable conversion formats for receiving as an input an embroidery pattern in an outline data format, and transforming at least some of said outline data points to new outline data points and generating as an output a different embroidery outline pattern capable of being an input to any of said plurality of conversion formats, at least some of said conversion formats being selected from the group comprising vertical, rotate, arc, circle, three-letter, vertical arc, bridge-double, bridge-flat-bottom, and bridge-flat-top, said conversion formats being operable in a data processing system having a variable screen display being capable of displaying said embroidery patterns and said different embroidery outline patterns;

interactively selecting at least one successive conversion format from said plurality of conversion formats and directing said input outline as an input to a first selected conversion format, each conversion format generating a transformed outline as an output, each transformed outline being directed as an input to a next successive selected conversion format until a last successive conversion format transformed outline corresponds to said desired embroidery pattern; and varying said screen display for successively displaying each transformed outline.

7. The method according to claim 6 further comprising the step of converting said desired embroidery pattern to a stitch format capable of controllably reproducing said desired embroidery pattern on an embroidery stitching machine.

8. The method according to claim 6 wherein said input embroidery pattern is capable of being in a stitch data format, said method further comprising the steps of:

providing a selectable converter format for receiving as an input an embroidery pattern in a stitch data format for converting said stitch data format to an outline data format and generating as an output an embroidery pattern in an outline data format capable of being received as an input to said plurality of selectable conversion formats; and applying said input embroidery pattern to said converter format for converting said input embroidery pattern to an outline data format.

9. A method for converting an embroidery expression in an outline format to a bridge-style outline format which comprises the steps of:

interactively defining or retrieving an embroidery expression comprising at least one embroidery character in an outline format and spacing therebetween, each character outline comprising a plurality of x and y-coordinate stitch points, each character outline having a predetermined width and height, said expression having a width being equal to the sum of said at least one character width and said spacing, and a height equal to a maximum of said at least one character outline height;

interactively defining a plurality of points being capable of describing a circle having a radius and a center, and selecting on said circle starting and ending points defining an arc, a straight line between said starting and ending points being a baseline having a length;

scaling said embroidery expression width to be equal to said baseline length, and scaling said expression height to a user-defined height; and determining a scaling factor at each x-coordinate stitch point of said at least one character outline for determining a modified y-coordinate for each x-coordinate stitch point for bridging each character outline according to said arc, and applying said scaling factor to each y-coordinate for each x-coordinate, thereby scaling said y-coordinates according to said arc, said outline with scaled y-coordinates being a bridge-style outline format of said embroidery expression.

* * * * *